United States Patent
Price et al.

(10) Patent No.: US 10,237,268 B2
(45) Date of Patent: Mar. 19, 2019

(54) SECURE PASSCODE PROCESSING DEVICE

(71) Applicant: GOOGLE LLC, Mountain View, CA (US)

(72) Inventors: Thomas Price, San Francisco, CA (US); Anurag Agrawal, Palo Alto, CA (US)

(73) Assignee: GOOGLE LLC, Mountain View, CA (US)

(*) Notice: Subject to any disclaimer, the term of this patent is extended or adjusted under 35 U.S.C. 154(b) by 113 days.

(21) Appl. No.: 15/342,083

(22) Filed: Nov. 2, 2016

(65) Prior Publication Data
US 2018/0124035 A1 May 3, 2018

(51) Int. Cl.
*H04L 29/06* (2006.01)

(52) U.S. Cl.
CPC ........ *H04L 63/083* (2013.01); *H04L 63/0428* (2013.01); *H04L 63/0442* (2013.01); *H04L 63/061* (2013.01)

(58) Field of Classification Search
CPC ............. H04L 63/0428; H04L 63/0442; H04L 63/061; H04L 63/083
See application file for complete search history.

(56) References Cited

U.S. PATENT DOCUMENTS

| | | | |
|---|---|---|---|
| 6,266,418 B1* | 7/2001 | Carter | H04L 9/065 379/442 |
| 9,059,971 B2* | 6/2015 | Graham | H04L 63/0428 |
| 9,667,412 B2* | 5/2017 | Huang | G06F 21/35 |
| 9,740,832 B2* | 8/2017 | Shi | G06F 3/04883 |
| 9,747,926 B2* | 8/2017 | Sharifi | G10L 17/08 |
| 9,819,651 B2* | 11/2017 | Mahler | H04L 63/0428 |
| 9,866,539 B2* | 1/2018 | Levchenko | H04L 63/0464 |
| 9,940,930 B1* | 4/2018 | Campbell | G10L 15/22 |
| 2002/0085698 A1* | 7/2002 | Liebenow | H04M 1/665 379/207.13 |
| 2003/0165239 A1* | 9/2003 | Bantz | H04K 1/00 380/53 |

(Continued)

OTHER PUBLICATIONS

D. Schürmann and S. Sigg, "Secure Communication Based on Ambient Audio," in IEEE Transactions on Mobile Computing, vol. 12, No. 2, pp. 358-370, Feb. 2013. (Year: 2013).*

(Continued)

*Primary Examiner* — Kari L Schmidt
(74) *Attorney, Agent, or Firm* — Morgan, Lewis & Bockius LLP

(57) ABSTRACT

A computing system is described that at least one microphone, a secure processing unit, and a general processing unit. The microphone is coupled to an audio processor configured to receive at least one audio signal from the at least one microphone and generate a first encrypted audio signal and a second encrypted audio signal The secure processing unit is configured to: receive the first encrypted audio signal from the audio processor, decrypt the first encrypted audio signal, and responsive to determining that the first encrypted audio signal includes an unlock command, output an indication of a decryption key. The general processing unit is configured to: receive the second encrypted audio signal from the audio processor, and decrypt the second encrypted audio signal with the decryption key.

20 Claims, 7 Drawing Sheets

(56) References Cited

U.S. PATENT DOCUMENTS

| | | | |
|---|---|---|---|
| 2005/0123137 A1* | 6/2005 | McCallum | G06F 21/10 380/255 |
| 2011/0275348 A1* | 11/2011 | Clark | G06F 21/32 455/411 |
| 2012/0023573 A1* | 1/2012 | Shi | G06F 3/04883 726/17 |
| 2012/0036556 A1* | 2/2012 | LeBeau | G06F 3/048 726/3 |
| 2013/0148810 A1* | 6/2013 | Goel | H04L 9/0891 380/278 |
| 2014/0012586 A1* | 1/2014 | Rubin | G10L 25/51 704/273 |
| 2014/0093083 A1* | 4/2014 | Dadu | G06F 21/62 380/275 |
| 2014/0215496 A1* | 7/2014 | Sexton | G06F 3/048 719/318 |
| 2014/0372126 A1* | 12/2014 | Ady | G10L 25/48 704/270.1 |
| 2015/0121506 A1* | 4/2015 | Cavanaugh | G06F 21/62 726/16 |
| 2015/0245154 A1* | 8/2015 | Dadu | G06F 3/167 381/56 |
| 2015/0257004 A1 | 9/2015 | Shanmugam et al. | |
| 2016/0020905 A1* | 1/2016 | Poole | G06F 21/6227 713/184 |
| 2016/0055102 A1* | 2/2016 | de Cesare | H04L 9/0869 713/193 |
| 2016/0094338 A1* | 3/2016 | Pappachan | G06F 21/445 713/189 |
| 2016/0119338 A1* | 4/2016 | Cheyer | G06F 21/32 726/4 |
| 2016/0155443 A1* | 6/2016 | Khan | G06F 1/3203 704/275 |
| 2016/0173456 A1* | 6/2016 | Wei | |
| 2016/0253519 A1* | 9/2016 | Broumas | G06F 21/6245 713/189 |
| 2016/0330315 A1* | 11/2016 | Hazzani | H04L 63/308 |
| 2016/0350068 A1* | 12/2016 | Fournier | G06F 3/165 |
| 2017/0025124 A1* | 1/2017 | Mixter | G10L 15/32 |
| 2017/0026344 A1* | 1/2017 | Mahler | H04L 63/0428 |
| 2017/0110144 A1* | 4/2017 | Sharifi | G10L 17/08 |
| 2017/0178668 A1* | 6/2017 | Kar | G10L 25/78 |
| 2017/0193212 A1* | 7/2017 | Lai | G06F 3/0488 |
| 2017/0310648 A1* | 10/2017 | Levchenko | H04L 63/0464 |
| 2017/0329977 A1* | 11/2017 | Lee | G06F 21/602 |
| 2018/0007013 A1* | 1/2018 | Wang | H04W 76/10 |
| 2018/0082683 A1* | 3/2018 | Chen | G10L 15/22 |

OTHER PUBLICATIONS

G. R. Bagwe, D. S. Apsingekar, S. Gandhare and S. Pawar, "Voice encryption and decryption in telecommunication," 2016 International Conference on Communication and Signal Processing (ICCSP), Melmaruvathur, 2016, pp. 1790-1793. (Year: 2016).*

* cited by examiner

SECURE PASSCODE PROCESSING DEVICE

BACKGROUND

Some network-connected devices, such as those found in a home, are capable of listening, seeing, and sensing conditions at or near a location of the device. Such devices can be vulnerable to unauthorized access by remote network-connected devices located outside the location. For example, a video or audio stream detected by a home device at a home location may be vulnerable to hacking and unauthorized access by a remote network-connected device located at a different location outside the home location, without the knowledge of users of the home device that are at the home location. Accordingly, some network-connected devices may contribute to a user's loss of privacy and/or various types of information theft, and also may contribute to a lack of trust in internet-connected devices within the home or elsewhere.

SUMMARY

In one example, a computing system comprises: at least one microphone coupled to an audio processor, the audio processor being configured to receive at least one audio signal from the at least one microphone and generate a first encrypted audio signal and a second encrypted audio signal; a secure processing unit configured to: receive the first encrypted audio signal from the audio processor, decrypt the first encrypted audio signal, and responsive to determining that the first encrypted audio signal includes an unlock command, output an indication of a decryption key; and a general processing unit configured to: receive the second encrypted audio signal from the audio processor, and decrypt the second encrypted audio signal with the decryption key.

In another example, a method comprises: receiving, by a secure processing unit, a first encrypted audio signal from an audio processor; decrypting, by the secure processing unit, the first encrypted audio signal; responsive to determining that the first encrypted audio signal includes an unlock command, output, by the secure processing unit, an indication of a decryption key; receiving, by a general processing unit, a second encrypted audio signal from the audio processor; and decrypting, by the general processing unit, the second encrypted audio signal with the decryption key.

In another example, a computing system comprises: at least one sensor coupled to an input processor, the input processor being configured to receive at least one signal from the at least one sensor including both audio and video data, and generate a first encrypted signal and a second encrypted signal; a secure processing unit configured to: receive the first encrypted signal from the input processor, decrypt the first encrypted signal, and responsive to determining that the first encrypted signal includes an unlock command, output an indication of a decryption key; and a general processing unit configured to: receive the second encrypted signal from the input processor, and decrypt the second encrypted signal with the decryption key.

DETAILED DESCRIPTION

This disclosure is directed to techniques that may enable a computing system, by using an isolated and/or protected processing unit, to determine whether detected input corresponds to a passcode intended to unlock features of a device. In some examples, and in accordance with one or more aspects of the present disclosure, the computing system may be a computing device executing a virtual assistant or intelligent assistant that may perform search, computational, and/or other tasks either at the direction of a user, or on its own accord. Such a computing device may generate output to provide information or to assist one or more users in various ways.

In some examples, a computing system may include a sensor device, such as a microphone, that detects audio input and encrypts information corresponding to the audio input. The sensor device may distribute the encrypted audio information to both a general processing unit and a secure processing unit. The secure processing unit may have access to a decryption key, and may be able to decrypt the encrypted audio information. The general processing unit might not initially have access to the decryption key, so the general processing unit may be unable to decrypt the encrypted audio information until it is given access to the decryption key.

The secure processing unit may decrypt the encrypted audio information it receives from the sensor device, and may determine that the information corresponds to a passcode. In response to determining that the information corresponds to a passcode, the secure processing unit may send a decryption key to the general processing unit, thereby enabling the general processing unit to decrypt the encrypted audio information it receives from the sensor device. In some examples, the sensor device may also capture images or other information, and may encrypt such information and distribute encrypted information to the general processing unit. The general processing unit may also be able to decrypt such encrypted information with the decryption key it receives from the secure processing unit or with another decryption key.

The secure processing unit may be physically separate or isolated from general processing unit in some respects, including but not limited to being isolated from any network interfaces of the computing system and/or remote network-connected devices. Further, the general processing unit may be limited in its ability to control or send information to the secure processing unit. For instance, the general processing unit might be able to send only limited or no information to the secure processing unit. The general processing unit may also receive limited information from the secure processing unit. Limiting communication between the general processing unit and the secure processing unit may reduce or preclude opportunities for intruders to gain unauthorized access to information needed to decrypt audio or video or other information detected by the sensor device.

Figure 1:
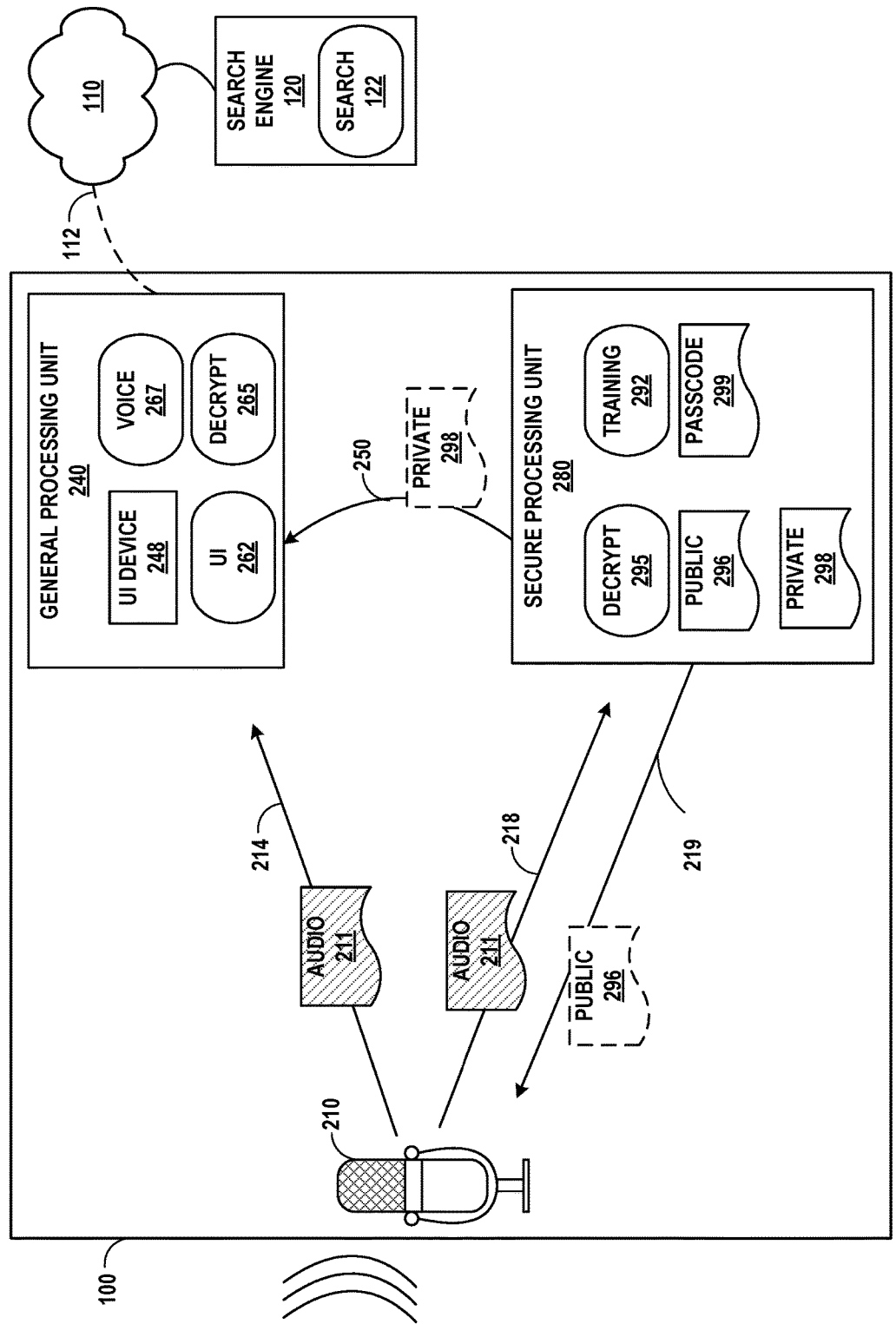
FIG. 1 is a conceptual diagram illustrating an example computing system that is configured to process audio or other input in a secure manner, and communicate search queries or other information over network, in accordance with one or more aspects of the present disclosure.

FIG. 1 is a conceptual diagram illustrating an example computing system that is configured to process audio or other input in a secure manner, and communicate search queries or other information over network, in accordance with one or more aspects of the present disclosure. In FIG. 1, computing system 100 may detect input, and may, based on the detected input, transmit a request for information over network connection 112. Network 110 may receive the request and route the request to search engine 120. Search engine 120 may respond to the request, and computing system may output information derived from the response.

Network 110 may be the internet, or may represent any public or private communications network, for instance, cellular, Wi-Fi, and/or other types of networks, for transmitting data between computing systems, servers, and computing devices. Network 110 may include one or more network hubs, network switches, network routers, or any other network equipment, that are operatively inter-coupled thereby providing for the exchange of information between computers, devices, or other components (e.g., between computing system 100 and search engine 120). One or more of computing system 100, search engine 120, or other devices may transmit and receive data, control signals, commands, and/or other information across network 110 using any suitable communication techniques. Computing system 100 and search engine 120 may each be operatively coupled to network 110 using one or more network links. The links coupling devices to network 110 may be Ethernet, ATM or other types of network connections, and such connections may be wireless and/or wired connections.

Search engine 120 may be implemented through any suitable computing system, such as one or more server computers, desktop computers, laptop computers, mainframes, appliances, cloud computing systems, etc. capable of sending and receiving information both to and from a network, such as network 110. For example, search engine 120 may host or provide access to services provided by one or more modules of search engine 120. Client devices (e.g., computing system 100) may communicate with search engine 120 over network 110 to access services provided by one or more modules of search engine 120. In some examples, search engine 120 may represent a search service and/or a cloud computing system that provides services to client devices and other devices or systems.

Search module 122 of search engine 120 may execute a search for information determined to be relevant to a search query that search module 122 receives from computing system 100 (e.g., as part of a task that computing system 100 is completing on behalf of a user of computing system 100).

Search module 122 may conduct an Internet search based on a search query received from computing system 100 to identify information (e.g., weather or traffic conditions, news, stock prices, sports scores, user schedules, transportation schedules, retail prices, etc.) related to the search query from among from a variety of information sources (e.g., either stored locally or remote to search engine 120). After executing a search, search module 122 may output the information returned from the search (e.g., the search results) to computing system 100 over network 110.

Computing system 100 may include sensing device 210, general processing unit 240, and secure processing unit 280. General processing unit 240 may include user interface device 248, user interface module 262, voice recognition module 267, and decryption module 265. Secure processing unit 280 may include training module 292, decryption module 295, public encryption key 296, private decryption key 298, and passcode 299.

Sensing device 210 may communicate with general processing unit 240 over communication channel 214. Sensing device 210 may communicate with secure processing unit 280 over communication channel 218 and communication channel 219. Secure processing unit 280 may communicate with general processing unit 240 over communication channel 250.

In the example shown, communication channel 214, communication channel 218, communication channel 219, and communication channel 250 may allow for communication in only one direction. In other examples, one or more of communication channel 214, communication channel 218, communication channel 219, and communication channel 250 allow for bi-directional communication.

In some examples, computing system 100 may be implemented as a single device. In other examples, computing system 100 may be implemented as more than one device. FIG. 1 illustrates one particular example of computing system 100, and many other examples of computing system 100 may be implemented or used in other instances and may include a subset of the components, devices, modules, or other aspects included in FIG. 1 or may include additional components not shown in FIG. 1.

Search module 122, user interface module 262, voice recognition module 267, decryption module 265, training module 292, and/or decryption module 295 as illustrated in FIG. 1 (or modules otherwise described herein) may perform operations described using software, hardware, firmware, or a mixture of hardware, software, and firmware residing in and/or executing at computing system 100, search engine 120, or another computing device. A computing device may execute each of such module(s) with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform.

Sensing device 210 may include one or more microphones or audio sensors that detect voices, sounds, or other audio information. Although sensing device 210 is described in connection with FIG. 1 as primarily detecting audio information, sensing device 210 may alternatively, or in addition, detect other types of information, including image, environmental, motion, geolocation, or other information. Accordingly, sensing device 210 may include one or more cameras or image sensors that detect light, images, movement, or other information.

Sensing device 210 may be configured to detect primarily voices in a home setting. Sensing device 210 may include an audio processor and/or an image processor for encrypting audio, video, or other information using an encryption key, such as, for example, public encryption key 296. For example, an audio processor may receive an audio signal from a microphone and generate an encrypted audio signal; an image processor may receive a video signal from a camera and generate an encrypted video signal. And generally, an input processor may receive a signal from a sensor and generate an encrypted signal. Sensing device 210 may accordingly include circuitry for performing a hardware-based encryption of information. Sensing device 210 may perform some or all encryption using software, firmware, or other logic. Sensing device 210 may receive from secure processing unit 280, over communication channel 219, information that may include public encryption key 296. Sensing device 210 may output one or more encrypted indications of audio information 211 to general processing unit 240 and secure processing unit 280.

General processing unit 240 may implement functionality and/or execute instructions associated with computing system 100. General processing unit 240 may be connected to network 110 and may, based on audio or other information received by general processing unit 240, perform various intelligent assistant or virtual assistant functions. For example, general processing unit 240 may perform internet searches, or obtain personal information associated with a user of computing system 100.

Secure processing unit 280 may implement functionality and/or execute instructions associated with analyzing audio or other information, and determining whether such information includes a passcode. For example, secure processing unit 280 may decrypt a stream of audio information, and determine whether the audio information includes a passcode spoken by a user of computing system 100. In the example of FIG. 1, secure processing unit 280 is not directly connected to network 110.

General processing unit 240 may be limited in its ability to communicate with secure processing unit 280. For instance, general processing unit 240 may be unable to cause secure processing unit 280 to execute any instructions, and may be unable to affect the operation of secure processing unit 280. In some examples, general processing unit 240 may be able to send limited information to secure processing unit 280, but such information might be used for limited purposes by secure processing unit 280. In some examples, such limitations may be imposed or the result of a hardware configuration that precludes certain types of access. For instance, secure processing unit 280 and general processing unit 240 may be physically connected in such a way that general processing unit 240 may be able send information to a specific port or a limited set of ports, which may prevent general processing unit 240 from causing secure processing unit 280 to execute instructions. In another example, general processing unit 240 might receive information from secure processing unit 280 only over communication channel 250, and not send information to secure processing unit 280. In such an example, communication channel 250 may send information only in one direction, and may be physically connected in such a way that general processing unit 240 is unable to send information to secure processing unit 280.

Since general processing unit 240 may be connected to network 110 over network connection 112, it may be possible for an unauthorized user to gain access to some or all functions of general processing unit 240. However, if there are physical, hardware, or other barriers that limit the ability of general processing unit 240 to affect the operation of secure processing unit 280, it may be difficult or impossible to attack secure processing unit 280 from network 110, even with access to general processing unit 240. And if it is difficult or impossible to attack secure processing unit 280, it may be difficult or impossible for an unauthorized user to gain access to an unencrypted audio stream corresponding to the audio detected by sensing device 210. Similarly, it may be difficult or impossible to attack secure processing unit 280 in a way that enables an unauthorized user to gain access to passcode 299 and/or private decryption key 298.

General processing unit 240 of computing system 100 may include user interface device 248. In some examples, user interface device 248 may function as an output device for general processing unit 240. For example, user interface device 248 may function as an output (e.g., audio) device using any one or more audio output devices, and may include speaker or other audio technologies. In addition, user interface device 248 may function as an output device using any one or more display devices, such as a liquid crystal display (LCD), dot matrix display, light emitting diode (LED) display, organic light-emitting diode (OLED) display, e-ink, or similar monochrome or color display capable of outputting visible information to a user of computing system 100. Further, user interface device 248 may otherwise function as an output device using haptic feedback technologies, or other output device technologies for use in outputting information to a user.

In some examples, user interface device 248 may function primarily as an output device. In other examples, user interface device 248 may function as both an input and/or output device for general processing unit 240. In examples where user interface device 248 functions as an input device, user interface device 248 may be implemented using various technologies. For instance, user interface device 248 may use a presence-sensitive input screen, such as a resistive touchscreen, surface acoustic wave touchscreen, capacitive touchscreen, projective capacitance touchscreen, pressure sensitive screen, acoustic pulse recognition touchscreen, or another presence-sensitive display technology. In addition, user interface device 248 may include microphone technologies, infrared sensor technologies, or other input device technology for use in receiving user input.

Where user interface device 248 includes a presence-sensitive display that functions as an input device, user interface device 248 may receive tactile input from a user of computing system 100. In such an implementation, user interface device 248 may receive indications of tactile input by detecting one or more gestures from a user (e.g., the user touching or pointing to one or more locations of user interface device 248 with a finger or a stylus pen). User interface device 248 may also present output to a user at the presence-sensitive display. User interface device 248 may, for example, present the output as a graphical user interface.

General processing unit 240 of computing system 100 may include user interface module 262. User interface module 262 may manage user interactions with user interface device 248 and other components of general processing unit 240. User interface module 262 may cause user interface device 248 to output audio, video, or various user interfaces, for display or presentation, as a user of computing system 100 hears or views output and/or provides input at user interface device 248. User interface device 248 may detect input, and may output to user interface module 262 one or more indications of input as a user of computing system 100 interacts with a user interface presented by user interface device 248. User interface module 262 and user interface device 248 may interpret inputs detected at user interface device 248 and may relay information about the inputs detected at user interface device 248 to one or more associated platforms, operating systems, applications, and/or services executing at computing system 100 to cause general processing unit 240 to perform one or more functions.

User interface module 262 may receive information and instructions from a platform, operating system, application, and/or service executing at computing system 100, general processing unit 240, and/or one or more remote computing systems, such as, for example, search engine 120. In addition, user interface module 262 may act as an intermediary between a platform, operating system, application, and/or service executing at general processing unit 240 and various output devices of general processing unit 240 (e.g., speakers, LED indicators, audio or electrostatic haptic output devices, displays, etc.) to produce output (e.g., a graphic, a flash of light, a sound, a haptic response, etc.).

User interface module 262 may perform operations described using software, hardware, firmware, or a mixture of hardware, software, and firmware residing in and/or executing at general processing unit 240. General processing unit 240 may execute user interface module 262 with multiple processors or multiple devices, as a virtual machine executing on underlying hardware, as one or more services of an operating system or computing platform, and/or as one or more executable programs at an application layer of a computing platform.

Decryption module 265 may generally perform encryption-related operations, which may include decrypting audio information received from sensing device 210. Decryption module 265 may interact with and/or operate in conjunction with one or more modules of general processing unit 240. Decryption module 265 may receive input that it determines corresponds to one or more encrypted indications of audio information 211 from sensing device 210 over communication channel 214. Decryption module 265 may attempt to decrypt one or more encrypted indications of audio information 211, and decryption module 265 may determine unencrypted information (e.g., audio). Decryption module 265 may output to voice recognition module 267 audio information.

Voice recognition module 267 may perform functions relating to voice-recognition and may also determine one or more operations to perform as a result of interpreting voice information or determining one or more voice or other commands. Voice recognition module 267 may interact with and/or operate in conjunction with one or more other modules of general processing unit 240 to perform one or more determined operations. Voice recognition module 267 may receive audio information from one or more modules of general processing unit 240, including decryption module 265 and/or user interface module 262. Voice recognition module 267 may cause user interface module 262 to output audio information through user interface device 248. Voice recognition module 267 may also cause user interface module 262 to present a graphical user interface at user interface device 248. Voice recognition module 267 may also cause general processing unit 240 to send information over network connection 112 to network 110. For example, voice recognition module 267 may cause general processing unit 240 to send a search query over network 110 to search engine 120.

Decryption module 295 of secure processing unit 280 may perform encryption-related operations, which may include decrypting audio information secure processing unit 280 receives from sensing device 210. Decryption module 295 may decrypt one or more encrypted indications of audio information 211 using private decryption key 298. Decryption module 295 may also generate or regenerate public encryption key 296 and private decryption key 298, and may cause secure processing unit 280 to output public encryption key 296 over communication channel 219 to sensing device 210. Decryption module 295 may interact with one or more modules of secure processing unit 280, including training module 292 when establishing, changing, or resetting passcode 299. Decryption module 295 may also output private decryption key 298 over communication channel 250 when decryption module 295 determines that one or more encrypted indications of audio information 211 includes or corresponds to passcode 299.

Training module 292 of secure processing unit 280 may perform functions relating to establishing passcode 299 and learning characteristics of voices of one or more users of computing system 100. Training module 292 may receive from decryption module 295 unencrypted audio information that training module 292 uses to determine and learn passcode 299. Training module 292 may determine, based on unencrypted audio information, characteristics of audio information, such as words spoken by one or more users. Training module 292 may also determine, based on unencrypted audio information and other information, one or more passcodes 299. Training module 292 may output information to general processing unit 240 when establishing, confirming, or changing passcode 299.

In the example of FIG. 1, an in accordance with one or more aspects of the present disclosure, sensing device 210 may detect audio input, encrypt information corresponding to the audio input, and send one or more encrypted indications of audio information 211 to both general processing unit 240 and secure processing unit 280. Sensing device 210 may perform the encryption with public encryption key 296 before encrypted indications of audio information 211 are sent to general processing unit 240 over communication channel 214. Sensing device 210 may perform the encryption with public encryption key 296 before encrypted indications of audio information 211 are sent to secure processing unit 280 over communication channel 218.

Computing system 100 may initially perform a setup procedure that involves training computing system 100 to interpret a passcode. For example, when computing system 100 is initialized, started for the first time, or reset, passcode 299 might not be stored in secure processing unit 280 or otherwise accessible to secure processing unit 280. Training module 292 of secure processing unit 280 may determine that passcode 299 is not stored in secure processing unit 280 (or otherwise accessible to secure processing unit 280), and in response, training module 292 may send information to general processing unit 240 over communication channel 250, and general processing unit 240 may receive the information and determine that the information corresponds to user instructions for establishing passcode 299. General processing unit 240 may cause user interface module 262 to present a user prompt through user interface device 248, prompting a user for input when initially establishing passcode 299. Such a prompt may be, for example, an audio prompt if user interface device 248 includes a speaker or audio component. For instance, user interface device 248 may output audio information that includes a prompt such as "say a passcode to secure your device."

Sensing device 210 may detect audio input in response to the prompt. Sensing device 210 may generate encrypted indication of audio information 211 using public encryption key 296. Sensing device 210 may have previously received public encryption key 296 from secure processing unit 280 over communication channel 219, as further described below. Public encryption key 296 may be stored at sensing device 210 during manufacturing of computing system 100. Sensing device 210 may derive public encryption key 296 from hardware, logic, or firmware included in sensing device 210 during manufacturing.

Sensing device 210 may send one or more encrypted indications of audio information 211 to secure processing unit 280 over communication channel 218. As further described below, sensing device 210 may also send one or more encrypted indications of audio information 211 to general processing unit 240 over communication channel 214, but general processing unit 240 might be unable to decrypt encrypted indications of audio information 211. Secure processing unit 280 may receive one or more encrypted indications of audio information 211 from sensing device 210, and decryption module 295 of secure processing unit 280 may decrypt one or more encrypted indications of audio information 211 using private decryption key 298. Decryption module 295 may output information about the audio to training module 292, and training module 292 may use such information in determining passcode 299.

Training module 292 may continue to send information to general processing unit 240 over communication channel 250 during the setup and/or training procedure, and in response, general processing unit 240 may cause user interface device 248 to continue to prompt the user during the setup procedure. For instance, training module 292 may seek to confirm a detected passcode. Training module 292 may send information to general processing unit 240 over communication channel 250, and in response, user interface module 262 of general processing unit 240 may cause user interface device 248 to output an audio prompt such as "say your passcode again to confirm." Sensing device 210 may continue to detect audio input, and may continue to send one or more encrypted indications of audio information 211 over communication channel 218 to secure processing unit 280 during the setup procedure. Decryption module 295 may continue decrypt encrypted indications of audio information 211 and output information about the audio to training module 292. Training module 292 may eventually determine passcode 299, and secure processing unit 280 may store passcode 299 or a hashed version of passcode 299.

In the setup procedure described above, user interface module 262 of general processing unit 240 may cause user interface device 248 to output audio information to, for example, prompt a user to say, confirm, or otherwise configure a passcode. In other examples, such as where user interface device 248 includes a display, user interface module 262 of general processing unit 240 may cause user interface module 262 to, alternatively or in addition, output visual information.

Further, in some examples, secure processing unit 280 may include sufficient hardware and/or software to perform all user interface functions needed for establishing passcode 299. In such an example, secure processing unit 280 might not need to communicate with general processing unit 240 during the setup procedure. For example, secure processing unit 280 may include a user interface module and one or more user interface devices (which may include a speaker and/or display device).

In the setup procedure described above, sensing device 210 is described as encrypting, using public encryption key 296, one or more indications of audio corresponding to audio input detected by sensing device 210. Although in most examples, sensing device 210 may encrypt indications of audio corresponding to audio input that it sends to secure processing unit 280 and/or general processing unit 240 during the setup procedure, it is possible that in some examples, sensing device 210 might not encrypt the audio it detects during the setup procedure and/or in connection with establishing passcode 299. In such an example, sensing device 210 might not distribute audio information to general processing unit 240 during the setup procedure.

Once passcode 299 has been established, sensing device 210 may continue to detect audio information. Sensing device 210 may distribute one or more encrypted indications of audio information 211 to general processing unit 240 over communication channel 214 and may also distribute one or more encrypted indications of audio information 211 to secure processing unit 280 over communication channel 218. In FIG. 1, secure processing unit 280 has access to private decryption key 298, so decryption module 295 of secure processing unit 280 may be able to decrypt encrypted indications of audio information 211 received over communication channel 218. However, although sensing device 210 distributes one or more encrypted indications of audio information 211 to general processing unit 240, general processing unit 240 might be unable to decrypt encrypted indications of audio information 211 that general processing unit 240 receives from sensing device 210. If general processing unit 240 does not have access to private decryption key 298, general processing unit 240 might not be able to decrypt encrypted indications of audio information 211 until general processing unit 240 is given access to private decryption key 298. General processing unit 240 may be able to store encrypted indications of audio information 211 that it receives from sensing device 210, and general processing unit 240 may also be able to distribute and/or communicate one or more encrypted indications of audio information 211 to other devices over network 110. However, such information might not be useful to a hacker, intruder, user, or other entity or person because the information has been encrypted by sensing device 210.

Secure processing unit 280 may continue to receive encrypted indications of audio information 211 from sensing device 210. Decryption module 295 of secure processing unit 280 may continue to decrypt encrypted indications of audio information 211 using private decryption key 298. Decryption module 295 may compare the decrypted audio information to passcode 299. When secure processing unit 280 determines that one or more encrypted indications of audio information 211 includes, matches, and/or corresponds to passcode 299, decryption module 295 may determine that sensing device 210 has detected passcode 299. Secure processing unit 280 may determine that since sensing device 210 has detected passcode 299, general processing unit 240 should be given access to private decryption key 298 so that general processing unit 240 can process encrypted indications of audio information 211 that sensing device 210 distributes to general processing unit 240. Secure processing unit 280 may communicate private decryption key 298 over communication channel 250 to general processing unit 240. Once general processing unit 240 receives private decryption key 298, decryption module 265 of general processing unit 240 may be able to thereafter decrypt encrypted indications of audio information 211 that general processing unit 240 receives from sensing device 210.

After receiving private decryption key 298, general processing unit 240 may continue to receive one or more encrypted indications of audio information 211 from sensing device 210. Decryption module 265 of general processing unit 240 may decrypt one or more encrypted indications of audio information 211, and output to voice recognition module 267 information about the audio information.

Voice recognition module 267 may determine, based on the information received from decryption module 265, a search query. General processing unit 240 may send the search query to search engine 120 over network connection 112 and network 110. Search engine 120 may determine responsive information, and send to general processing unit 240 a response over network 110. General processing unit 240 may receive the response over network connection 112. General processing unit 240 may interpret the information received from search engine 120, and may cause user interface module 262 to present output at user interface device 248. The output presented by user interface device 248 may be derived from the information received from search engine 120, and may, for example, include audio information.

Before sending a query over network connection 112 to network 110, computing system 100 may ensure any user of computing system 100 has consented to such information being sent over network connection 112 to network 110. In some examples, computing system 100 may provide additional audio prompts and detect additional input that it determines corresponds to consent. In other examples, computing system 100 may determine consent in another way, and may give users of computing system 100 complete control over how computing system 100 collects and uses such collected information. In some examples, before computing system 100 stores, transmits, or uses personal information, computing system 100 may encrypt or otherwise treat the information to remove the actual identity of any associated user, so that personally-identifiable information is removed from the information. In some examples, computing system 100 may provide a mechanism or procedure for modifying or removing certain information before it is stored, transmitted, or used, thereby providing an opportunity for users to have complete control over the information being used by computing system 100.

Secure processing unit 280 may periodically or randomly generate or regenerate public encryption key 296 and private decryption key 298 so that once general processing unit 240 receives private decryption key 298, general processing unit 240 may be configured to decrypt encrypted indications of audio information 211 from sensing device 210 for only a limited time or a predefined duration. For instance, after a period of time since generating an initial public encryption key 296, secure processing unit 280 may generate a new public encryption key 296 and a new private decryption key 298. Secure processing unit 280 may distribute the new public encryption key 296 to sensing device 210 over communication channel 219. Sensing device 210 may thereafter generate one or more encrypted indications of audio information 211 using the new public encryption key 296, and distribute encrypted indications of audio information 211 to general processing unit 240. General processing unit 240 may be unable to decrypt such encrypted indications of audio information 211 using the initial private decryption key 298 until general processing unit 240 receives the new private decryption key 298 from secure processing unit 280.

Secure processing unit 280 may generate or regenerate a new public encryption key 296 and a new private decryption key 298 after a particular event occurs, such as detecting input corresponding to selecting a lock button, or corresponding to detecting an audio unlock or lock command. In such an example, secure processing unit 280 may distribute the new public encryption key 296 to sensing device 210 over communication channel 219. Sensing device 210 may thereafter generate one or more encrypted indications of audio information 211 using the new public encryption key 296, and distribute encrypted indications of audio information 211 to general processing unit 240 and to secure processing unit 280. Secure processing unit 280 may decrypt such encrypted indications of audio information 211 using the new private decryption key 298. General processing unit 240, however, may be unable to decrypt such encrypted indications of audio information 211 using the prior private decryption key 298 until general processing unit 240 receives the new private decryption key 298 from secure processing unit 280.

Throughout the disclosure, examples are described where a computing device and/or a computing system analyzes information (e.g., interest profiles, survey responses, context, locations, speeds, search queries, etc.) associated with a computing device and a user of a computing device, if the computing device receives permission from the user of the computing device to analyze the information. For example, in situations described or discussed in this disclosure, before computing system 100 collects or makes use of information associated with a user, the user may be provided with an opportunity to provide input to control whether programs or features of computing system 100 can collect and make use of user information (e.g., interest profiles, search information, survey information, information about a user's current location, current speed, etc.), or to dictate whether and/or how to the device and/or system may receive content that may be relevant to the user. In addition, certain data may be treated in one or more ways before it is stored or used by computing system 100 so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by computing system 100.

By preventing unauthorized access to sensors detecting information within a home, computing system 100 may be able to avoid breaches of security, and maintain the privacy and security of occupants of a home or other location. Consequently, devices or systems such as computing system 100 may become more trusted and may be viewed as less intrusive, and less of a security risk by the general population. If secure, such devices may become widely used, since the general population may have fewer concerns about the privacy and/or security implications presented by a device continually capturing audio, video, environmental conditions, and/or other information from within a home.

Further, by preventing unauthorized access to data collected by computing system 100, computing system 100 might not be subject to being controlled by an unauthorized user, and might perform only operations as directed by an authorized user. Consequently, if computing system 100 performs operations only as directed by authorized users, computing system 100 may perform fewer computing operations and network operations, since computing system 100 would perform operations for only authorized users. Further, if computing system 100 is more difficult to compromise, intruders may eventually make fewer attempts to hack or gain access to the data generated or collected by computing system 100, since such attempts will be less likely to succeed. Consequently, computing system 100 may perform fewer computing and network operations defending against network-initiated hacks or unauthorized attempts to gain access to computing system 100. As a result, since computing system 100 may perform fewer computing operations, computing system 100 may consume less electrical power. Also, since computing system 100 may perform fewer networking operations, computing system 100 may consume less network resources.

Still further, if one or more processors are used or, in some examples, dedicated to performing operations relating to decoding passcodes, such processors could be optimized for performing that task, and as a result, may perform that operation more quickly, efficiently, and may consume less power in doing so. Also, by offloading such decoding operations to a different processor, the general application processor might not need to perform that task (or portions of that task), and may be free to perform other tasks, potentially performing such tasks more quickly.

Figure 2:
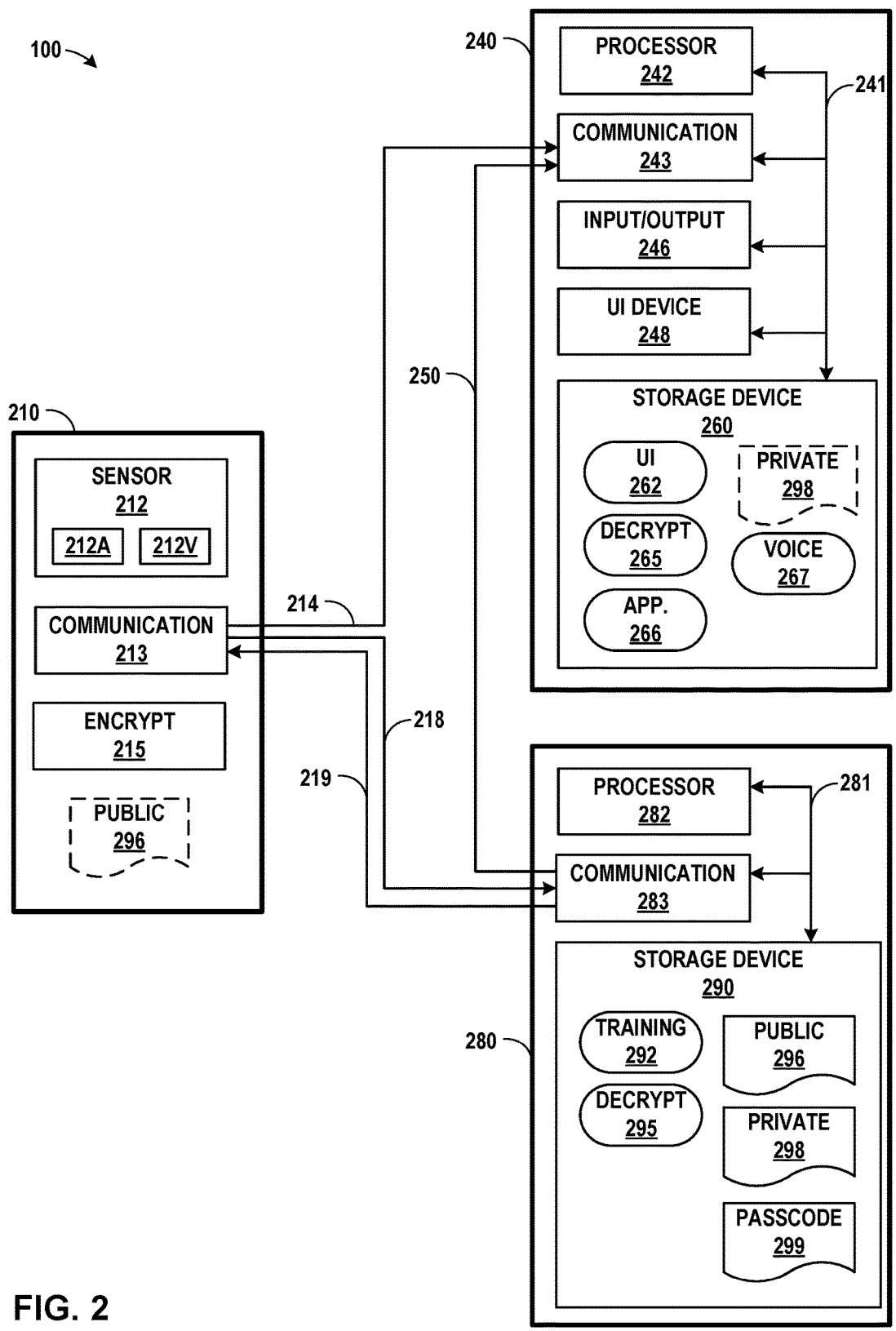
FIG. 2 is a block diagram illustrating an example computing system that is configured to securely process audio, video, or other information, in accordance with one or more aspects of the present disclosure.

FIG. 2 is a block diagram illustrating an example computing system that is configured to securely process audio, video, or other information, in accordance with one or more aspects of the present disclosure. Computing system 100 of FIG. 2 is described below as an example or alternate implementation of computing system 100 of FIG. 1. However, FIG. 2 illustrates one particular example or alternate implementation of computing system 100, and many other example or alternate implementations of computing system 100 may be used or may be appropriate in other instances. Such implementations may include a subset of the components included in the example of FIG. 2 or may include additional components not shown in the example of FIG. 2.

Although computing system 100 of FIG. 2 may be a stand-alone device, computing system 100 may, generally, take many forms, and may be, or may be part of, any component, device, or system that includes processors or other suitable computing environment for processing information or executing software instructions in accordance with one or more aspects of the present disclosure. In some examples, computing system 100 may be fully implemented as hardware in one or more devices or logic elements.

One or more aspects of FIG. 2 may be described below within the context of computing system 100 of FIG. 1. In the example of FIG. 2, computing system 100 includes sensing device 210, general processing unit 240, and secure processing unit 280. Sensing device 210 of computing system 100 may include one or more sensors 212, one or more communication units 213, and one or more encryption units 215. Sensors 212 may include audio sensor 212A and image sensor 212V.

General processing unit 240 of computing system 100 may include one or more processors 242, one or more communication units 243, one or more input/output devices 246, one or more user interface devices 248, and one or more storage devices 260. Communication channels 241 may interconnect each of the components within general processing unit 240 for inter-component communications (physically, communicatively, and/or operatively). In some examples, communication channels 241 may include a system bus, a network connection, an inter-process communication data structure, or any other method for communicating data. Storage device 260 may include user interface module 262, decryption module 265, application module 266, and voice recognition module 267. Storage device 260 may store additional information, such as, in some cases, private decryption key 298.

Secure processing unit 280 may include one or more processors 282, one or more communication units 283, and one or more storage devices 290. Storage device 290 may include training module 292 and decryption module 295. Communication channels 281 may interconnect each of the components within secure processing unit 280 for inter-component communications (physically, communicatively, and/or operatively). In some examples, communication channels 281 may include a system bus, a network connection, an inter-process communication data structure, or any other method for communicating data. Storage device 290 may store additional information, including public encryption key 296, private decryption key 298, and passcode 299.

One or more of communication channel 214, communication channel 218, communication channel 219, and communication channel 250 may interconnect components of FIG. 2 for inter-component communications (physically, communicatively, and/or operatively). In some examples, one or more of communication channel 214, communication channel 218, communication channel 219, and communication channel 250 may include a system bus, a network connection, an inter-process communication data structure, or another method for communicating data.

Sensing device 210 may communicate with general processing unit 240 and secure processing unit 280 over communication channel 214 and communication channel 218, respectively. In some examples, communication channel 214 and communication channel 218 enable one-way communication, but in other examples, communication channel 214 and communication channel 218 may enable two-way communication. Secure processing unit 280 may send information to sensing device 210 over communication channel 219. Further, secure processing unit 280 may communicate with general processing unit 240 over communication channel 250. In the example of FIG. 2, communication channel 250 provides only limited communication between general processing unit 240 and secure processing unit 280, and in some examples, communication channel 250 enables secure processing unit 280 to send information to general processing unit 240, but does not enable general processing unit 240 to send some or all types of information to secure processing unit 280. In other examples, general processing unit 240 may be able to communicate with secure processing unit 280. In some of such examples, general processing unit 240 may communicate with secure processing unit 280 in only a limited fashion. Similarly, one or more other connections between components of computing system 100, particularly those involving secure processing unit 280 (e.g., communication channel 218), may allow for only limited communications. By limiting access to secure processing unit 280 and/or by limiting the ability to control secure processing unit 280, such as by providing physical, hardware, or other connectivity barriers that limit opportunities to affect the operation of secure processing unit 280, it may be difficult or impossible to attack secure processing unit 280. Accordingly, it may be difficult or impossible for an unauthorized user to gain access to unencrypted data generated by sensing device 210.

One or more sensors 212 of sensing device 210 may detect input, which may include voices, sounds, images, motion, or other types of information. For example, sensors 212 may include one or more audio sensors 212A which may include one or more microphones, or other devices capable of detecting sounds or other audio information. Sensors 212 may also include one or more image sensors 212V, which may include one or more cameras, charge-coupled devices, or other type of image acquisition device. Image sensors 212V may also include infrared cameras, thermographic cameras, thermal imaging cameras, light-sensitive cameras, range sensors, tomography devices, radar devices, or ultrasonic cameras. In some examples, one or more image sensors 212V may include an image capture device appropriate for application of computer vision techniques. Depending on the type of sensors or cameras used, the resulting image may include two-dimensional images, three-dimensional volumes, or an image sequence.

Sensors 212 may also include other types of sensors. For example, sensors 212 may include an accelerometer that generates accelerometer data. Accelerometer data may indicate an acceleration and/or a change in acceleration of computing system 100. Sensors 212 may include a gyrometer that generates gyrometer data. Gyrometer data may indicate a physical orientation and/or change in physical orientation of computing system 100. In some examples, the orientation may be relative to one or more reference points. Sensors 212 may include a magnetometer that generates magnetometer data. Magnetometer data may indicate the magnetization of an object that is touching or in proximity to computing system 100. Magnetometer data may indicate the Earth's magnetic field, and in some examples, provide directional functionality of a compass. Sensors 212 may include an ambient light sensor that generates ambient light data. The ambient light data may indicate an intensity of light to which computing system 100 is exposed. Sensors 212 may include a proximity sensor that generates proximity data. Proximity data may indicate whether an object is within proximity to computing system 100. In some examples, proximity data may indicate how close an object is to computing system 100. In some examples, sensors 212 may include a clock that generates a date and time. The date and time may be a current date and time. Sensors 212 may include temperature sensor that measures ambient temperature in proximity to sensors 212. The ambient temperature may indicate an intensity of temperature.

One or more communication units 213 of sensing device 210 may communicate with devices external to sensing device 210 by transmitting and/or receiving data, and may operate, in some respects, as both an input device and an output device. Communication unit 213 may primarily communicate with general processing unit 240 and secure processing unit 280, and may in some cases be implemented as a wired connection. However, in some examples, communication unit 213 may communicate with other devices over a network. In such examples, communication units 213 may send and/or receive radio signals on a radio network such as a cellular radio network. In other examples, communication units 213 of sensing device 210 may transmit and/or receive satellite signals on a satellite network such as a Global Positioning System (GPS) network. Examples of communication units 213 include a network interface card (e.g. such as an Ethernet card), an optical transceiver, a radio frequency transceiver, a GPS receiver, or any other type of device that can send and/or receive information. Other examples of communication units 213 may include Bluetooth®, GPS, 3G, 4G, and Wi-Fi® radios found in mobile devices as well as Universal Serial Bus (USB) controllers and the like.

One or more encryption units 215 of sensing device 210 may perform encryption-related tasks. In some examples, encryption units 215 may include or be part of one or more audio processors configured to encrypt primarily audio information, although in other examples, encryption units 215 may also include or be part of one or more image processors that encrypt image, video, or other information. Encryption units 215 may perform encryption using public encryption key 296. Although described as a hardware device, sensors 212 could be implemented primarily or partially through software, firmware, or other logic. Encryption units 215 may receive from sensors 212 information that may include audio or video information (e.g., an audio signal or a video signal). Encryption units 215 may encrypt the information using public encryption key 296, and may output the encrypted information (e.g., as an encrypted audio signal or an encrypted video signal) to one or more other modules of sensing device 210. For example, encryption units 215 may output encrypted information to communication units 213.

In some cases, general processing unit 240 may include one or more input/output devices 246 that may generate, receive, or process input and/or output. For example, input/output devices 246 may generate input from a keyboard, pointing device, voice responsive system, video camera, button, sensor, mobile device, control pad, microphone, presence-sensitive screen, network, or any other type of device for detecting input from a human or machine. Further, input/output devices 246 may generate output in the form of tactile, audio, visual, and/or video output. Input/output devices 246 may include a display, sound card, video graphics adapter card, speaker, presence-sensitive screen, one or more USB interfaces, video and/or audio output interfaces, or any other type of device capable of generating tactile, audio, video, or other output. In some examples, input/output devices 246 may include a display device, which may function as an output device using technologies including liquid crystal displays (LCD), dot matrix displays, light emitting diode (LED) displays, organic light-emitting diode (OLED) displays, cathode ray tube (CRT) displays, e-ink, or monochrome, color, or any other type of display capable of generating tactile, audio, and/or visual output.

One or more user interface devices 248 may function as both an input and output device, and may be implemented in a manner consistent with the description provided earlier in connection with FIG. 1, and may include the same capabilities as described in connection with FIG. 1. In other examples, user interface devices 248 of FIG. 2 may be implemented in a manner different than that described in connection with FIG. 1. For example, user interface devices 248 of FIG. 2 may include more capabilities than those described in connection with FIG. 1, less capabilities than those described in connection with FIG. 1, or capabilities different than those described in connection with FIG. 1.

One or more communication units 243 of general processing unit 240 may communicate with devices external to general processing unit 240 by transmitting and/or receiving data, and may operate, in some respects, as both an input device and an output device. Communication units 243 may communicate with sensing device 210 and secure processing unit 280, but communication units 243 may also communicate with other devices over network 110. In such examples, communication units 243 may send and/or receive radio signals on a radio network such as a cellular radio network. In other examples, communication units 243 of general processing unit 240 may transmit and/or receive satellite signals on a satellite network such as a Global Positioning System (GPS) network. Examples of communication units 243 include a network interface card (e.g. such as an Ethernet card), an optical transceiver, a radio frequency transceiver, a GPS receiver, or any other type of device that can send and/or receive information. Other examples of communication units 243 may include Bluetooth®, GPS, 3G, 4G, and Wi-Fi® radios found in mobile devices as well as Universal Serial Bus (USB) controllers and the like.

One or more processors 242 of general processing unit 240 may implement functionality and/or execute instructions associated with general processing unit 240. Examples of processors 242 include microprocessors, application processors, display controllers, auxiliary processors, one or more sensor hubs, and any other hardware configured to function as a processor, a processing unit, or a processing device. General processing unit 240 may use one or more processors 242 to perform operations in accordance with one or more aspects of the present disclosure using software, hardware, firmware, or a mixture of hardware, software, and firmware residing in and/or executing at general processing unit 240.

One or more storage devices 260 within general processing unit 240 may store information for processing during operation of general processing unit 240. In some examples, one or more storage devices 260 are temporary memories, meaning that a primary purpose of the one or more storage devices is not long-term storage. Storage devices 260 on general processing unit 240 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 260, in some examples, also include one or more computer-readable storage media. Storage devices 260 may be configured to store larger amounts of information than volatile memory. Storage devices 260 may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories. Storage devices 260 may store program instructions and/or data associated with one or more of the modules described in accordance with one or more aspects of this disclosure.

One or more storage devices 260 of general processing unit 240 may include user interface module 262, decryption module 265, voice recognition module 267, and application module 266. Each such module may be implemented in a manner consistent with the description provided in connection with FIG. 1, and may include the same capabilities as described in connection with FIG. 1. In other examples, user interface module 262, decryption module 265, voice recognition module 267, and application module 266 of FIG. 2 may be implemented in a manner different than that described in connection with FIG. 1. For example, user interface module 262, decryption module 265, voice recognition module 267, and application module 266 of FIG. 2 may include more capabilities than those described in connection with FIG. 1, less capabilities than those described in connection with FIG. 1, or capabilities different than those described in connection with FIG. 1.

One or more application modules 266 may represent some or all of the other various individual applications and/or services executing at and accessible from general processing unit 240. A user of general processing unit 240 may interact with an audio interface or a graphical user interface associated with one or more application modules 266 to cause general processing unit 240 to perform a function. Numerous examples of application modules 266 may exist and may include virtual assistant tasks, intelligent assistant operations, search tasks, communication, shopping, note-taking, and any and all other applications that may execute at general processing unit 240 or computing system 100.

One or more processors 242 and one or more storage devices 260 may provide an operating environment or platform for one or one more modules, which may be implemented as software, but may in some examples include any combination of hardware, firmware, and software. One or more processors 242 may execute instructions and one or more storage devices 260 may store instructions and/or data of one or more modules. The combination of processors 242 and storage devices 260 may retrieve, store, and/or execute the instructions and/or data of one or more applications, modules, or software. Processors 242 and/or storage devices 260 may also be operably coupled to one or more other software and/or hardware components, including, but not limited to, one or more of the components illustrated in FIG. 2.

One or more communication units 283 of sensing device 210 may communicate with devices external to sensing device 210 by transmitting and/or receiving data, and may operate, in some respects, as both an input device and an output device. Communication unit 283 may in most cases primarily communicate with general processing unit 240 and sensing device 210, and may in most cases be implemented as a wired connection, and may involve one or more limited connections. However, in some examples, communication unit 283 could communicate with other devices over a network. In such examples, communication units 283 may send and/or receive radio signals on a radio network such as a cellular radio network. In other examples, communication units 283 of sensing device 210 may transmit and/or receive satellite signals on a satellite network such as a Global Positioning System (GPS) network. Examples of communication units 283 could include a network interface card (e.g. such as an Ethernet card), an optical transceiver, a radio frequency transceiver, a GPS receiver, or any other type of device that can send and/or receive information. Other examples of communication units 283 may include Bluetooth®, GPS, 3G, 4G, and Wi-Fi® radios found in mobile devices as well as Universal Serial Bus (USB) controllers and the like.

One or more processors 282 of secure processing unit 280 may implement functionality and/or execute instructions associated with secure processing unit 280. Examples of processors 282 include microprocessors, application processors, display controllers, auxiliary processors, one or more sensor hubs, and any other hardware configured to function as a processor, a processing unit, or a processing device. Secure processing unit 280 may use one or more processors 282 to perform operations in accordance with one or more aspects of the present disclosure using software, hardware, firmware, or a mixture of hardware, software, and firmware residing in and/or executing at secure processing unit 280.

One or more storage devices 290 within secure processing unit 280 may store information for processing during operation of secure processing unit 280. In some examples, one or more storage devices 290 are temporary memories, meaning that a primary purpose of the one or more storage devices is not long-term storage. Storage devices 290 on secure processing unit 280 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 290, in some examples, also include one or more computer-readable storage media.

Storage devices 290 may be configured to store larger amounts of information than volatile memory. Storage devices 290 may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories. Storage devices 290 may store program instructions and/or data associated with one or more of the modules described in accordance with one or more aspects of this disclosure.

One or more storage devices 290 of secure processing unit 280 may include training module 292 and decryption module 295, and each such module may be implemented in a manner consistent with the description provided in connection with FIG. 1, and may include the same capabilities as described in connection with FIG. 1. In other examples, training module 292 and decryption module 295 of FIG. 2 may be implemented in a manner different than that described in connection with FIG. 1. For example, training module 292 and decryption module 295 of FIG. 2 may include more capabilities than those described in connection with FIG. 1, less capabilities than those described in connection with FIG. 1, or capabilities different than those described in connection with FIG. 1.

One or more processors 282 and one or more storage devices 290 may provide an operating environment or platform for one or one more modules, which may be implemented as software, but may in some examples include any combination of hardware, firmware, and software. One or more processors 282 may execute instructions and one or more storage devices 290 may store instructions and/or data of one or more modules. The combination of processors 282 and storage devices 290 may retrieve, store, and/or execute the instructions and/or data of one or more applications, modules, or software. Processors 282 and/or storage devices 290 may also be operably coupled to one or more other software and/or hardware components, including, but not limited to, one or more of the components illustrated in FIG. 2.

Figure 3:
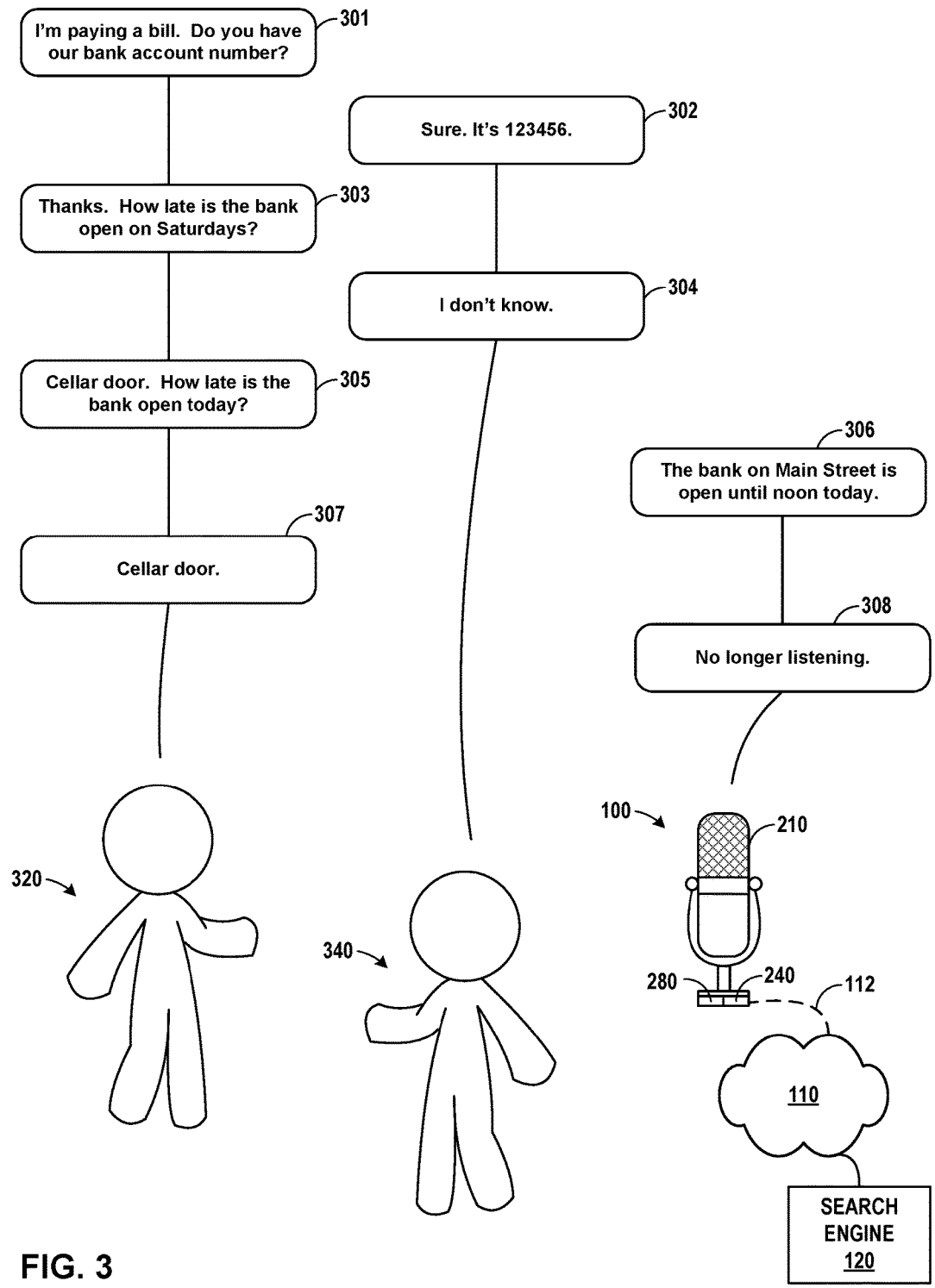
FIG. 3 is a conceptual diagram illustrating the operation of an example computing system that is configured to process audio input and communicate over a network in a secure manner in accordance with one or more aspects of the present disclosure.

FIG. 3 is a conceptual diagram illustrating the operation of an example computing system that is configured to process audio input and communicate over a network in a secure manner in accordance with one or more aspects of the present disclosure. In FIG. 3, computing system 100 may process audio input, send a request for information over network 110 to search engine 120, and receive information over network 110 in response to the request. Computing system 100 of FIG. 3 is described below as an example of computing system 100 of FIG. 2. One or more aspects of FIG. 3 may be described below within the context of computing system 100 of FIG. 2.

In the example of FIG. 3, computing system 100 includes sensing device 210, general processing unit 240, and secure processing unit 280. Computing system 100 may be connected to network 110 over network connection 112. Search engine 120 may be accessible over network 110. In some examples, computing system 100 as depicted in FIG. 3 may be implemented as a single device. In other examples, computing system 100 may be implemented as more than one device. FIG. 3 illustrates one particular example of computing system 100, and many other examples of computing system 100 may be used in other instances and may include a subset of the components, devices, modules, or other aspects included in FIG. 3 or may include additional components not shown in FIG. 3.

In the example of FIG. 3, and in accordance with one or more aspects of the present disclosure, computing system 100 may detect input while user 320 and user 340 are having a conversation. The conversation between user 320 and user 340 may include the sequence of spoken words illustrated in conversation bubble 301 through audio bubble 308. During this conversation, computing system 100 may detect audio input. For instance, sensor 212 of sensing device 210 may detect audio input, generate one or indications of audio input, and output the indications of audio input to one or more modules, including encryption unit 215. Encryption unit 215 of sensing device 210 may encrypt the indication of audio input. For example, encryption unit 215 may generate one or more encrypted indications of audio information 211 using public encryption key 296 received by communication unit 213 from general processing unit 240 over communication channel 219.

Sensing device 210 may distribute one or more encrypted indications of audio information 211 to both secure processing unit 280 and general processing unit 240. For example, encryption unit 215 of sensing device 210 may output to communication unit 213 encrypted indications of audio information 211. Communication unit 213 may send one or more encrypted indications of audio information 211 to general processing unit 240 over communication channel 214, and communication unit 213 may send one or more encrypted indications of audio information 211 to secure processing unit 280 over communication channel 218.

Secure processing unit 280 of computing system 100 may receive one or more encrypted indications of audio information 211 and decrypt encrypted indications of audio information 211 using private decryption key 298. Decryption module 295 may determine whether one or more encrypted indications of audio information 211 include a passcode to unlock computing system 100. General processing unit 240 of computing system 100 may also receive one or more encrypted indications of audio information 211. However, because general processing unit 240 does not have access to private decryption key 298, general processing unit 240 may be able to receive encrypted indications of audio information 211, but may be unable to decrypt encrypted indications of audio information 211. In some examples, if general processing unit 240 is compromised or attacked by an unauthorized person, device, or entity through network 110 (e.g., over network connection 112), one or more encrypted indications of audio information 211 might be accessed, but without access to private decryption key 298, encrypted indications of audio information 211 might not be useful.

Secure processing unit 280 might determine that detected audio information does not include passcode 299. For example, in conversation bubble 301 through conversation bubble 304, user 320 and user 340 are having a conversation that may include private information that neither user 320 nor user 340 would want to become public, such as a bank account number. In the example shown, during the conversation represented by conversation bubble 301 through conversation bubble 304, secure processing unit 280 might not detect the passcode in encrypted indications of audio information 211 if the passcode is, for example, the phrase "cellar door." As illustrated in conversation bubble 303 and conversation bubble 304, user 320 and user 340 may determine that they do not know how late their local bank is open, so they may decide to ask computing system 100 for assistance. User 320 starts conversation bubble 305 by saying "cellar door." In response to determining that detected audio information does not include passcode 299, secure processing unit 280 may refrain from sending private decryption key 298 to general processing unit 240 to prevent general processing unit 240 from being able to decrypt the audio information.

Secure processing unit 280 might determine that detected audio information does include passcode 299. For example, sensing device 210 of computing system 100 may detect audio input resulting from conversation bubble 305, and may encrypt one or more indications of audio information. Sensing device 210 may communicate one or more encrypted indications of audio information 211 to secure processing unit 280. Secure processing unit 280 may decrypt encrypted indications of audio information 211, and may determine that one or more encrypted indications of audio information 211 correspond to the phrase "cellar door." In the example of FIG. 3, if passcode 299 is "cellar door," secure processing unit 280 may determine that one or more encrypted indications of audio information 211 correspond to passcode 299. In response to such a determination, secure processing unit 280 may send private decryption key 298 to general processing unit 240. General processing unit 240 may thereafter use private decryption key 298 to decrypt one or more encrypted indications of audio information 211 it receives from sensing device 210.

General processing unit 240 may use private decryption key 298 to decrypt the remaining portion of conversation bubble 305. In other words, general processing unit 240 may receive from sensing device 210 one or more encrypted indications of audio information 211 that it decrypts using private decryption key 298. General processing unit 240 may determine that the decrypted information corresponds to the question "How late is the bank open today?" General processing unit 240 may generate a query that corresponds to or includes the question, and may perform a search using the query. In some examples, general processing unit 240 may communicate the query to over network connection 112 to network 110, and search engine 120 may receive the query. Search engine 120 may generate a response, and send the response over network 110 to general processing unit 240. General processing unit 240 may receive the response over network connection 112. General processing unit 240 may output information derived from the response. In the example of FIG. 3, general processing unit 240 of computing system 100 outputs audio information illustrated in audio bubble 306.

In some examples, before sending a query over network connection 112 to network 110, computing system 100 may ensure that user 320 and user 340 have consented to such information being sent over network connection 112 to network 110. In some examples, computing system 100 may provide additional audio prompts and/or detect additional input that it determines corresponds to consent. In other examples, user 320 and user 340 may provide consent in another way, thereby giving user 320 and user 340 complete control over how computing system 100 collects and uses the collected information. In some examples, before computing system 100 stores, transmits, or uses personal information, computing system 100 may encrypt or otherwise treat the information to remove the actual identity of any associated user, so that personally-identifiable information is removed from the information. In some examples, computing system 100 may provide a mechanism for modifying or removing certain information before it is stored, transmitted, or used, thereby providing an opportunity for users to control how personal information is used by computing system 100.

General processing unit 240 of computing system 100 may continue to receive, decrypt, analyze, and/or store audio information it receives from sensing device 210. In some examples, general processing unit 240 may continue to do so for a limited time, after which secure processing unit 280 may change or regenerate public encryption key 296 and/or private decryption key 298, and cause sensing device 210 to encrypt audio information using the new public encryption key 296. General processing unit 240 may then be unable to decrypt encrypted indications of audio information 211 general processing unit 240 receives from sensing device 210 if it does not have access to the new private decryption key 298.

In other examples, computing system 100 may relock in response to detecting audio that computing system 100 determines corresponds to a lock command. For instance, after general processing unit 240 of computing system 100 outputs audio information illustrated in audio bubble 306, sensing device 210 may detect input and distribute one or more encrypted indications of audio information 211 to general processing unit 240 and secure processing unit 280. Secure processing unit 280 (or general processing unit 240) may determine that one or more encrypted indications of audio information 211 corresponds to the audio information in conversation bubble 307. In response, secure processing unit 280 may regenerate new public encryption key 296 and new private decryption key 298, and may cause sensing device 210 to thereafter encrypt audio information using public encryption key 296. If general processing unit 240 does not have access to the new private decryption key 298, general processing unit 240 may be unable to decrypt encrypted indications of audio information 211 that general processing unit 240 receives from sensing device 210. Computing system 100 may output audio information illustrated in audio bubble 308, which may inform user 320 and user 340 that general processing unit 240 is no longer listening to audio information, or more accurately in some examples, that general processing unit 240 is no longer able to decrypt encrypted indications of audio information 211 corresponding to their conversation.

In the example described above, the lock command in conversation bubble 307 ("Cellar door") is the same as the unlock command or passcode 299 in conversation bubble 305. In other examples, a lock command may be different than an unlock command or passcode, or may include or be derived from passcode 299. For example, the lock command may be "Close cellar door." In some examples, the lock command may be configured during the training or setup procedure described in connection with FIG. 1.

Figure 4:
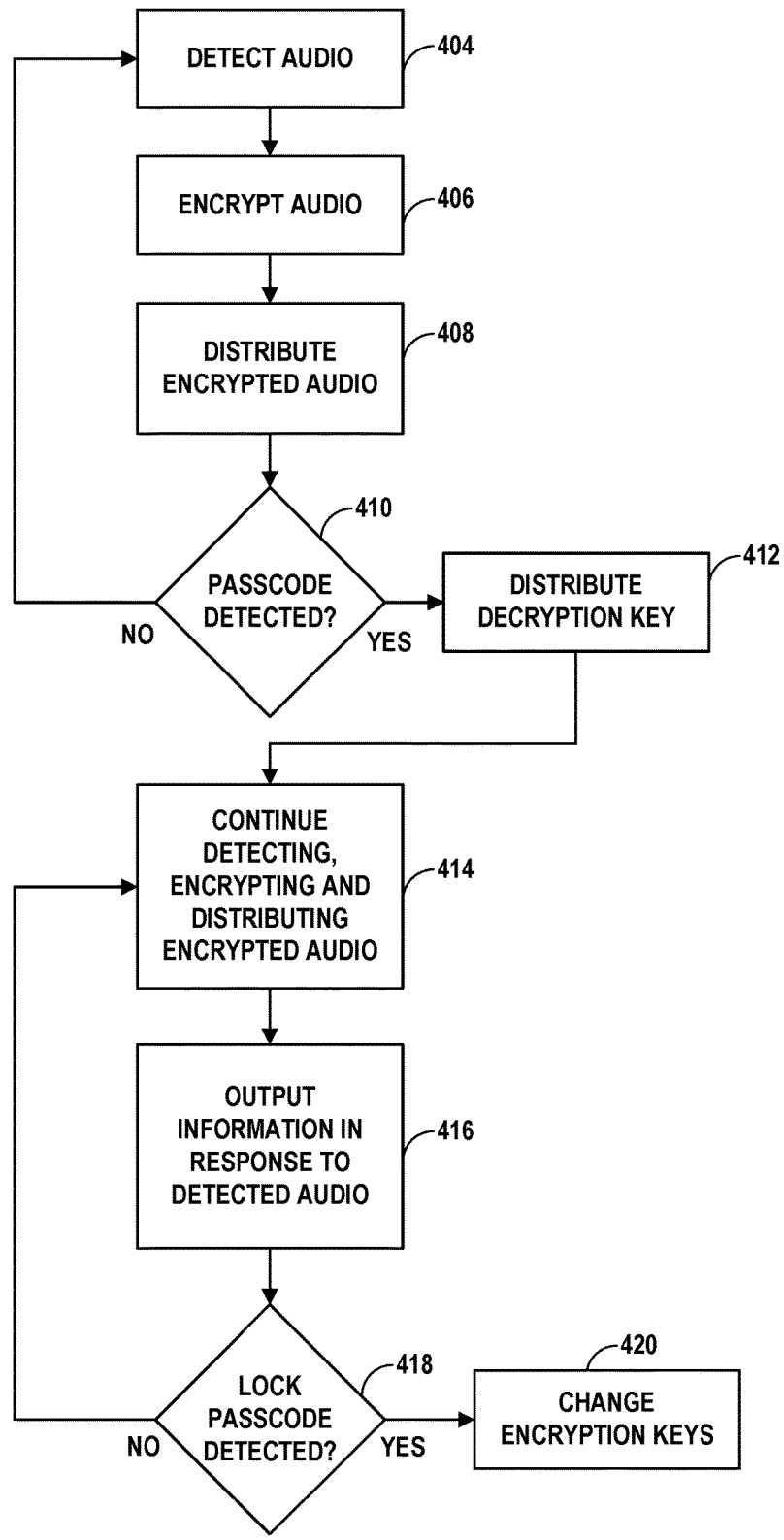
FIG. 4 is a flow diagram illustrating an example process for locking and unlocking an example computing system in accordance with one or more aspects of the present disclosure.

FIG. 4 is a flow diagram illustrating an example process for locking and unlocking an example computing system in accordance with one or more aspects of the present disclosure. The process of FIG. 4 may be performed by computing system 100 in the context illustrated in FIG. 1, FIG. 2, and/or FIG. 3. In other examples, operations described in connection with FIG. 4 may be performed by one or more other components, modules, systems, and/or devices. Further, in other examples, operations described in connection with FIG. 4 may be merged, performed in a difference sequence, or omitted.

In the example of FIG. 4, sensing device 210 of computing system 100 may detect audio information (404). For example, sensor 212 of sensing device 210 may detect audio input, may generate one or indications of audio input, and may output the indications of audio input to one or more modules, including encryption unit 215. Encryption unit 215 of sensing device 210 may encrypt the indication of audio input (406). For example, encryption unit 215 may generate one or more encrypted indications of audio information 211 using public encryption key 296 received by communication unit 213 from secure processing unit 280 over communication channel 219.

Sensing device 210 may distribute encrypted indication of audio information 211 (408). For example, encryption unit 215 of sensing device 210 may output to communication unit 213 encrypted indication of audio information 211. Communication unit 213 may send encrypted indication of audio information 211 to general processing unit 240 over communication channel 214. Communication unit 243 of general processing unit 240 may detect input and output to decryption module 265 an indication of detected input. Decryption module 265 may determine that the indication of detected input corresponds to encrypted audio information. Decryption module 265 may attempt to decrypt the information, but if decryption module 265 does not have access to private decryption key 298, decryption module 265 might not be successful in decrypting encrypted indication of audio information 211.

Communication unit 213 may also send encrypted indication of audio information 211 to secure processing unit 280 over communication channel 218. Communication unit 283 of secure processing unit 280 may detect input and output to decryption module 295 an indication of detected input. Decryption module 295 may determine that the indication of detected input corresponds to encrypted audio information. Decryption module 295 may decrypt encrypted indication of audio information 211 using private decryption key 298.

Decryption module 295 may determine, based on the decrypted audio information, that the decrypted audio information does not include passcode 299 (NO path from 410). Decryption module 295 may alternatively determine, based on the decrypted audio information, that the decrypted audio information does include passcode 299 (YES path from 410). Responsive to determining that the decrypted audio information includes passcode 299, secure processing unit 280 may distribute private decryption key 298 to general processing unit 240 (412). For example, decryption module 295 may cause communication unit 283 to send private decryption key 298 to general processing unit 240 over communication channel 250. Communication unit 243 may detect input and output to decryption module 265 an indication of the detected input. Decryption module 265 may determine that the indication of detected input corresponds to private decryption key 298. Decryption module 265 may store private decryption key 298 in storage device 260.

Sensing device 210 may continue to detect input, generate one or more encrypted indications of audio information 211, and distribute one or more encrypted indications of audio information 211 to general processing unit 240 and secure processing unit 280 (414). For example, decryption module 265 may receive from communication unit 243 an indication of input that decryption module 265 determines corresponds to encrypted audio, and decryption module 265 may determine decrypted audio information using private decryption key 298.

In some examples, both general processing unit 240 and secure processing unit 280 may decrypt encrypted indications of audio information 211 using the same private decryption key 298. For example, if the one or more encrypted indications of audio information 211 received by general processing unit 240 are the same as the one or more encrypted indications of audio information 211 received by secure processing unit 280, the same private decryption key 298 may be used to decrypt audio information 211.

In other examples, however, sensing device 210 may distribute a first set of encrypted indications of audio information 211 to general processing unit 240 and may distribute a different set of encrypted indications of audio information 211 to secure processing unit 280. In such an example, the underlying audio information may be the same, but the information may be encrypted using two different encryption keys. For instance, sensing device 210 may encrypt audio information intended for general processing unit 240 with public encryption key 296, and sensing device 210 may encrypt audio information intended for secure processing unit 280 with a public key corresponding to a different private key than key 298. Accordingly, secure processing unit 280 may decrypt encrypted indications of audio information 211 that secure processing unit 280 receives from sensing device 210 with a different decryption key than private decryption key 298.

Decryption module 265 may output to voice recognition module 267 information about the decrypted audio information. Voice recognition module 267 of general processing unit 240 may analyze the information and generate one or more search queries based on the decrypted audio. Voice recognition module 267 may perform a search by causing communication unit 243 to send one or more search queries over network connection 112 to network 110. Communication unit 243 may receive input in response, and output to voice recognition module 267 an indication of the input. Voice recognition module 267 may determine, based on the indication of input, that the input corresponds to information responsive to one or more search queries, and voice recognition module 267 may cause user interface module 262 to output responsive information through user interface device 248 (416).

Sensing device 210 may continue to detect input, generate encrypted indications of audio information 211, and distribute encrypted indications of audio information 211 to general processing unit 240 and secure processing unit 280. Secure processing unit 280 may receive one or more encrypted indications of audio information 211 from sensing device 210 that it determines corresponds to a lock command. Decryption module 295 of secure processing unit 280 may generate a new public encryption key 296 and a new private decryption key 298 (420). Secure processing unit 280 may send the new public encryption key 296 to sensing device 210 over communication channel 219. Sensing device 210 may thereafter generate one or more encrypted indications of audio information 211 using the new public encryption key 296. Sensing device 210 may distribute encrypted indications of audio information 211 to general processing unit 240, but general processing unit 240 might be unable to decrypt encrypted indications of audio information 211 until it receives the new private decryption key 298 from secure processing unit 280. In some examples, secure processing unit 280 may distribute the new private decryption key 298 to general processing unit 240 when secure processing unit 280 detects one or more encrypted indications of audio information 211 corresponding to passcode 299.

In the example illustrated in FIG. 4, general processing unit 240 may be able to continue to decrypt one or more encrypted indications of audio information 211 until a lock passcode is detected (418). In other examples, general processing unit 240 may be able to decrypt on or more encrypted indications of audio information 211 for a limited period of time. For instance, secure processing unit 280 may regenerate a new public encryption key 296 and a new private decryption key 298 periodically, such as after a certain period of inactivity.

In the example of FIG. 3, secure processing unit 280 may cause computing system 100 to enter a locked state when secure processing unit 280 receives one or more encrypted indications of audio information 211 that it determines corresponds to a lock command. Upon making such a determination, secure processing unit 280 may generate a new public encryption key 296 and a new private decryption key 298. Secure processing unit 280 may distribute new public encryption key 296 to sensing device 210, and cause sensing device 210 to thereafter encrypt information using the new public encryption key 296. In some examples, this may disable the ability of general processing unit 240 to decrypt one or more encrypted indications of audio information 211 that general processing unit 240 receives from sensing device 210, since the prior private encryption key 298 may no longer decrypt the audio information received from sensing device 210.

In other examples, secure processing unit 280 may, alternatively or in addition, disable the ability of general processing unit 240 to decrypt one or more encrypted indications of audio information 211 in a different way, such as by sending a command to general processing unit 240 that general processing unit 240 interprets as a command to destroy any stored private decryption key 298. In other examples, secure processing unit 280 may, alternatively or in addition, disable the ability of general processing unit 240 to decrypt one or more encrypted indications of audio information 211 in another way.

Further, in one or more previously-described examples, sensing device 210 may generate one or more encrypted indications of audio information 211 that it distributes to general processing unit 240 and secure processing unit 280. In some examples, sensing device 210 distributes the same information to both general processing unit 240 and secure processing unit 280. In other examples, sensing device 210 might distribute different information to general processing unit 240 and secure processing unit 280. For instance, sensing device 210 may encrypt the information it sends to general processing unit 240 with one encryption key, and sensing device 210 may encrypt the information it sends to secure processing unit 280 using a different encryption key. In such an example, secure processing unit 280 may have access to one or more decryption keys corresponding to both encryption keys used to encrypt the information sensing device 210 sends to general processing unit 240 and secure processing unit 280. When secure processing unit 280 determines an unlock command, secure processing unit 280 may distribute one or more appropriate encryption keys to general processing unit 240.

Figure 5:
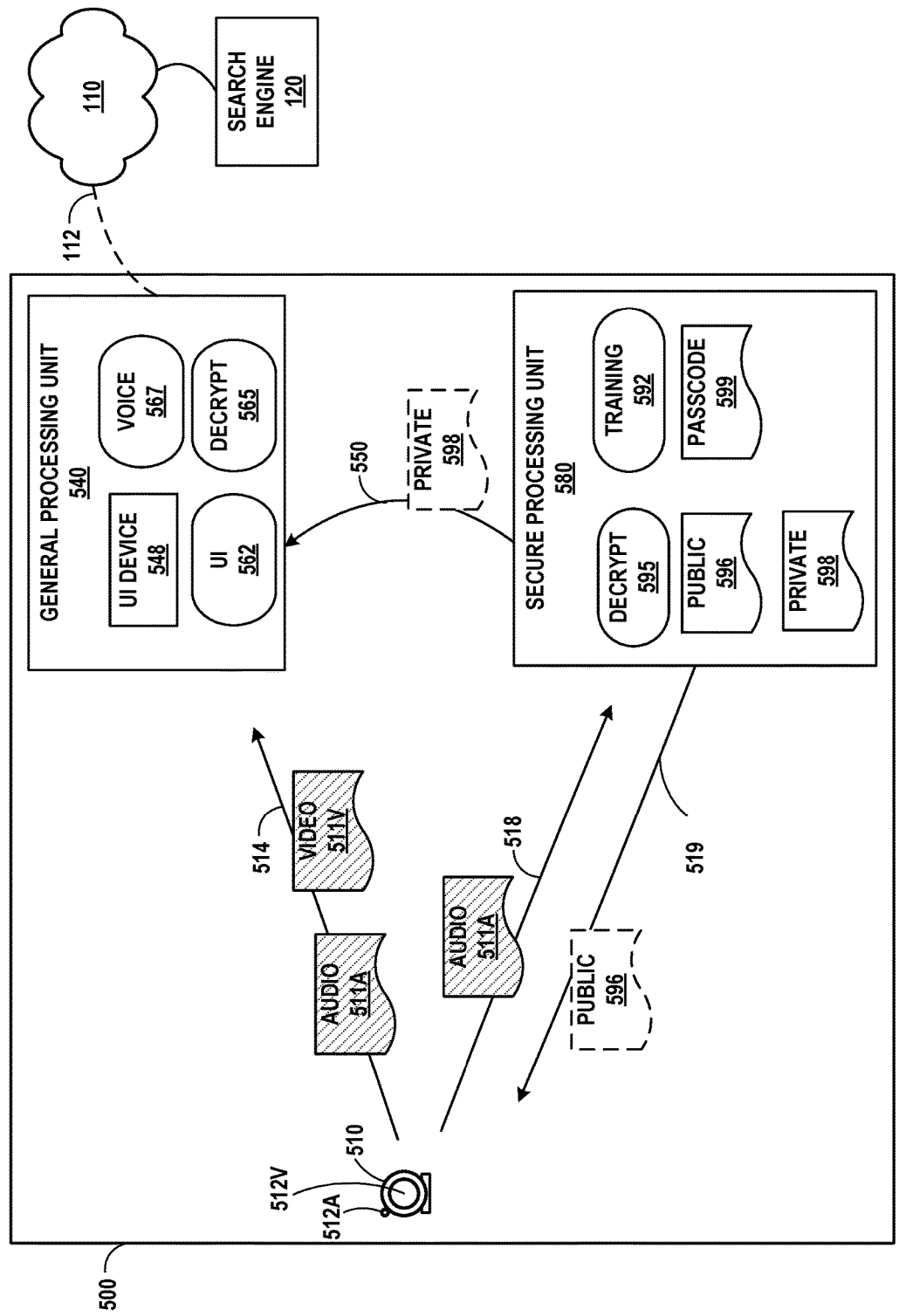
FIG. 5 is a conceptual diagram illustrating an example computing system that is configured to process audio and video input in a secure manner, and communicate audio, video, and other information over a network, in accordance with one or more aspects of the present disclosure.

FIG. 5 is a conceptual diagram illustrating an example computing system that is configured to process audio and video input in a secure manner, and communicate audio, video, and/or other information over a network, in accordance with one or more aspects of the present disclosure. In FIG. 5, computing system 500 may process audio and video input, and communicate such information over network 110 (e.g., such as during a video conference). Computing system 500 of FIG. 5 is described below as an example of computing system 100 of FIG. 2. One or more aspects of FIG. 5 may be described below within the context of computing system 100 of FIG. 2.

In the example of FIG. 5, computing system 500 includes webcam 510, general processing unit 540, and secure processing unit 580. Computing system 500 may be connected to network 110 over network connection 112. Search engine 120 may be accessible over network 110. Webcam 510 may include microphone 512A and camera 512V. Microphone 512A and camera 512V may be implemented in a manner consistent with the description of audio sensor 212A and image sensor 212V, respectively, provided in connection with FIG. 2, and may include the same capabilities as described in connection with FIG. 2. In other examples, microphone 512A and camera 512V of FIG. 5 may be implemented in a manner different than that described in connection with FIG. 2. For example, microphone 512A and camera 512V of FIG. 5 may include more capabilities than audio sensor 212A and image sensor 212V described in connection with FIG. 2, less capabilities than audio sensor 212A and image sensor 212V described in connection with FIG. 2, or capabilities different than audio sensor 212A and image sensor 212V described in connection with FIG. 2.

Also, general processing unit 540 of FIG. 5 may be implemented in a manner similar to that described in connection with FIG. 2, and in general, user interface device 548, user interface module 562, voice recognition module 567, and decryption module 565 may correspond to user interface device 248, user interface module 262, voice recognition module 267, and decryption module 265, respectively. Similarly, secure processing unit 580 of FIG. 5 may be implemented in a manner similar to that described in connection with FIG. 2, and in general, training module 592 and decryption module 595 may correspond to training module 292 and decryption module 295, respectively. Computing system 500 may be implemented as a single device. In other examples, however, computing system 500 may be implemented as more than one device. FIG. 5 illustrates one particular example of computing system 500, and many other examples of computing system 500 may be used in other instances and may include a subset of the components, devices, modules, or other aspects included in FIG. 5 or may include additional components not shown in FIG. 5.

In the example of FIG. 5, and in accordance with one or more aspects of the present disclosure, microphone 512A of webcam 510 may detect audio input, encrypt audio information using an encryption key, and generate one or more encrypted indications of audio information 511A. Webcam 510 may communicate encrypted indications of audio information 511A to general processing unit 540 over communication channel 514. Webcam 510 may also communicate encrypted indications of audio information 511A to secure processing unit 580 over communication channel 518. In addition, camera 512V of webcam 510 may detect image or video input. Webcam 510 may encrypt such input, and generate one or more encrypted indications of image information 511V. Webcam 510 may send encrypted indications of image information 511V to general processing unit 540 over communication channel 514. In the example of FIG. 5, webcam 510 might not send encrypted indications of image information 511V to secure processing unit 580. In other examples, however, webcam 510 may send encrypted indication of image information 511V to secure processing unit 580 over communication channel 518.

In a manner similar to computing system 100 of FIG. 1, computing system 500 may perform a setup procedure to establish a passcode, such as passcode 599. As in the example of FIG. 1, passcode 599 may be an audio passcode, but in other examples, passcode 599 may be based on video or image information (e.g., an iris scan or facial recognition scan). At startup, training module 592 of secure processing unit 580 may determine that passcode 599 has not been created. Training module 592 may send information to general processing unit 540 over limited communication channel 550 that general processing unit 540 determines corresponds to user instructions for establishing passcode 599. General processing unit 540 may cause user interface module 562 to present a user prompt through user interface device 548. In the example of FIG. 5, microphone 512A of webcam 510 may detect audio input in response to the prompt. Webcam 510 may generate one or more encrypted indications of audio information 511A using public key 596. Webcam 510 may send one or more encrypted indications of audio information 511A to secure processing unit 580 over communication channel 518. Secure processing unit 580 may receive one or more encrypted indications of audio information 511A, and decryption module 595 of secure processing unit 580 may decrypt encrypted indications of audio information 511A using private key 598. Decryption module 595 may output information about the audio to training module 592, and training module 592 may use such information to determine passcode 599.

Microphone 512A of webcam 510 may continue to detect audio information, encrypt the audio information, and generate one or more encrypted indications of audio information 511A. In addition, in FIG. 5, camera 512V of webcam 510 may detect image information, encrypt the image information, and generate one or more encrypted indications of image information 511V. Webcam 510 may send, to general processing unit 540 over communication channel 514, one or more encrypted indications of audio information 511A and one or more encrypted indications of image information 511V. Webcam 510 may also send, to secure processing unit 580 over communication channel 518, one or more encrypted indications of audio information 511A. In some examples, webcam 510 might not send encrypted indications of image information 511V to secure processing unit 580, but in other examples, webcam 510 may send encrypted indications of image information 511V to secure processing unit 580.

In FIG. 5, secure processing unit 580 has access to private key 598, so decryption module 595 of secure processing unit 580 may be able to decrypt encrypted indications of audio information 511A received over communication channel 518. However, although webcam 510 distributes one or more encrypted indications of audio information 511A and one or more encrypted indications of image information 511V to general processing unit 540, until general processing unit 540 has access to private key 598, general processing unit 540 might be unable to decrypt encrypted indications of audio information 511A and encrypted indications of image information 511V that general processing unit 540 receives from webcam 510.

Secure processing unit 580 may continue to receive encrypted indications of audio information 511A from webcam 510. Decryption module 595 of secure processing unit 580 may continue to decrypt encrypted indications of audio information 511A using private key 598. Decryption module 595 may compare the decrypted audio information to passcode 599. When secure processing unit 580 determines that one or more encrypted indications of audio information 511A includes, matches, and/or corresponds to passcode 599, decryption module 595 may determine that webcam 510 has detected passcode 599. Secure processing unit 580 may determine that since webcam 510 has detected input corresponding to passcode 599, computing system 500 should be unlocked so that general processing unit 540 can decrypt and process encrypted indications of audio information 511A and encrypted indications of image information 511V that webcam 510 sends to general processing unit 540. Secure processing unit 580 may communicate private key 598 over limited communication channel 550 to general processing unit 540. Once general processing unit 540 receives private key 598, decryption module 565 of general processing unit 540 may be able to thereafter decrypt encrypted indications of audio information 511A that general processing unit 540 receives from webcam 510. Also, decryption module 565 of general processing unit 540 may be able to thereafter decrypt encrypted indications of image information 511V that general processing unit 540 receives from webcam 510.

In some examples, webcam 510 may use the same public key 596 to encrypt both audio and video information. In other examples, webcam 510 may have a separate public key 596 for encrypting audio and video information. In such an example, secure processing unit 580 may have a separate private key 598 for decrypting audio and video information. Secure processing unit 580 may, upon detecting an unlock command, send more than one private key 598 to general processing unit 540. Also, in a manner similar to that described in connection with previous examples, secure processing unit 580 may, in some examples, periodically regenerate public keys 596 and private keys 598 so that once general processing unit 540 receives one or more private keys 598, general processing unit 540 may decrypt encrypted indications of audio information 511A and/or encrypted indications of image information 511V from webcam 510 for a limited time.

In a manner similar to that described in connection with previous examples, general processing unit 540 may be limited in its ability to communicate with secure processing unit 580. For instance, general processing unit 540 may be unable to cause secure processing unit 580 to execute any instructions, and may be unable to affect the operation of secure processing unit 580. In some examples, general processing unit 540 may be able to send limited information to secure processing unit 580, but such information might be used for only specific purposes by secure processing unit 580. In some examples, such limitations may be imposed or the result of a hardware configuration that precludes certain types of access. For instance, secure processing unit 580 and general processing unit 540 may be physically connected in such a way that general processing unit 540 may be able send information only to a specific port or a limited set of ports, which may prevent general processing unit 540 from causing secure processing unit 580 to execute instructions. In another example, general processing unit 540 might only receive information from secure processing unit 580 over limited communication channel 550, and not send information to secure processing unit 580. In such an example, limited communication channel 550 may send information only in one direction, and may be physically connected in such a way that general processing unit 540 is unable to send information to secure processing unit 580.

Figure 6:
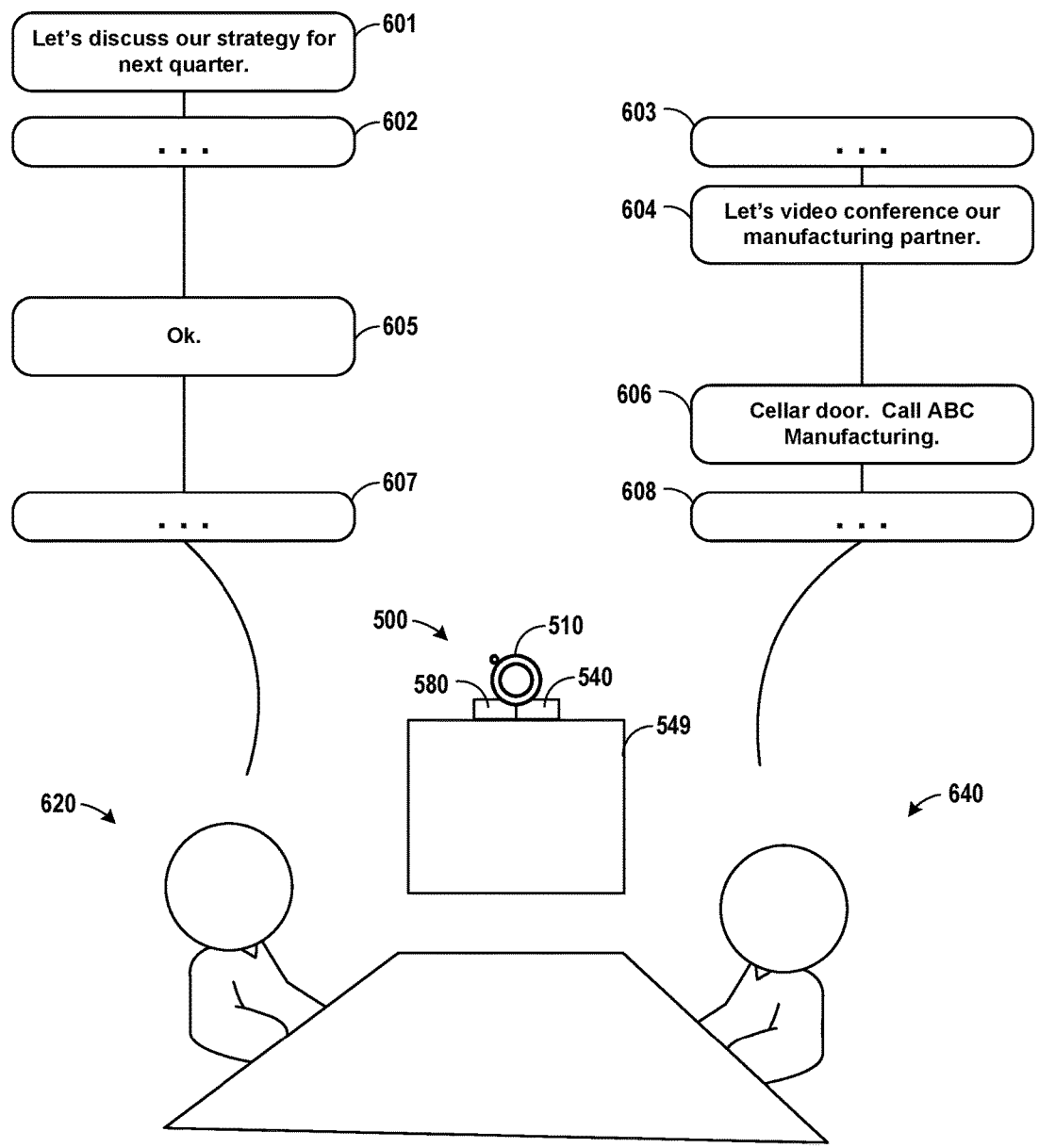
FIG. 6 is a conceptual diagram illustrating the operation of an example computing system that is configured to securely process audio and video input and communicate over a network during a video conference in accordance with one or more aspects of the present disclosure.

FIG. 6 is a conceptual diagram illustrating the operation of an example computing system that is configured to securely process audio and video input and communicate over a network during a video conference in accordance with one or more aspects of the present disclosure. Computing system 500 of FIG. 6 is described below as an example of computing system 500 of FIG. 5, and may be described below within the context of computing system 500 of FIG. 5.

In the example of FIG. 6, computing system 500 includes webcam 510, general processing unit 540, and secure processing unit 580. Computing system 500 may be connected to network 110 and search engine 120 over network connection 112, such as in the manner illustrated in FIG. 5. In the example of FIG. 6, computing system 500 may further include video display 549, which may present video and audio output received from one or more other devices over network 110. In some examples, computing system 500 may be implemented as a single device. In other examples, computing system 500 may be implemented as more than one device. FIG. 6 illustrates one particular example of computing system 500, and many other examples of computing system 500 may be used in other instances and may include a subset of the components, devices, modules, or other aspects included in FIG. 6 or may include additional components not shown in FIG. 6.

In the example of FIG. 6, and in accordance with one or more aspects of the present disclosure, webcam 510 may detect audio and video information. For example, webcam 510 may detect images of user 620 and user 640 in a conference room, and webcam 510 may detect audio input corresponding to the spoken words illustrated in conversation bubble 601 through conversation bubble 608. Microphone 512A may detect audio input, encrypt the audio information corresponding to the input, and send one or more encrypted indications of audio information 511A to both secure processing unit 580 and general processing unit 540. Camera 512V may detect image input, encrypt image information corresponding to the input, and send one or more encrypted indications of image information 511V to general processing unit 540.

In the example of FIG. 6, secure processing unit 580 of computing system 500 may decrypt encrypted indications of audio information 511A using private key 598 and analyze the decrypted audio information. Because general processing unit 540 does not have access to private key 598, general processing unit 540 may be unable to decrypt either encrypted indications of audio information 511A or encrypted indications of image information 511V that general processing unit 540 receives from webcam 510.

In conversation bubble 601 through conversation bubble 604, user 620 and user 640 may be having a conversation that may include confidential business information, and may, for example, include demonstration of a product that has not been publicly released. Therefore, user 620 and user 640 might prefer that the audio of their conversation be kept private, and they might also prefer that any images captured by webcam 510 be kept private and not distributed to any unauthorized person or user outside of the conference room depicted in FIG. 6. Accordingly, it may be important that computing system 500 be kept secure so that unauthorized users do not gain access to audio or video information detected by webcam 510.

In FIG. 6, during the conversation represented by conversation bubble 601 through conversation bubble 605, secure processing unit 580 may receive one or more encrypted indications of audio information 511A, but may determine that passcode 599 is not included in the audio information. As illustrated in conversation bubble 604 and conversation bubble 605, user 620 and user 640 decide to initiate a video conference with a business partner. As indicated in conversation bubble 605, user 640 says the words "Cellar door."

Webcam 510 of computing system 500 may detect audio input corresponding to the audio of conversation bubble 605. Webcam 510 may generate one or more encrypted indications of audio information 511A, and webcam 510 may communicate one or more encrypted indications of audio information 511A to secure processing unit 580. Secure processing unit 580 may decrypt encrypted indications of audio information 511A, and may determine that one or more encrypted indications of audio information 511A correspond to the phrase "cellar door." In the example of FIG. 6, passcode 599 is "cellar door." In response to determining that one or more encrypted indications of audio information 511A correspond to passcode 599, secure processing unit 580 may send private key 598 to general processing unit 540.

In a different example, where secure processing unit 580 determines that detected audio information does not include passcode 599, secure processing unit 580 may refrain from sending private decryption key 598 to general processing unit 540 to prevent general processing unit 540 from being able to decrypt the audio information.

Once general processing unit 540 receives passcode 599, general processing unit 540 may thereafter use private key 598 to decrypt encrypted indications of audio information 511A it receives from webcam 510. Further, general processing unit 540 may thereafter use private key 598 to decrypt encrypted indications of image information 511V it receives from webcam 510. Accordingly, after secure processing unit 580 determines that webcam 510 has detected passcode 599, computing system 500 may enter an unlocked state, so that general processing unit 540 may determine unencrypted audio and video streams detected by webcam 510.

In the example of FIG. 6, webcam 510 may detect audio input corresponding to the remaining words in conversation bubble 606, and may send one or more encrypted indications of audio information 511A corresponding to the audio input to general processing unit 540. General processing unit 540 may determine, using private key 598, that the audio information corresponds to a request to call "ABC Manufacturing." In response, general processing unit 540 may initiate a videoconference call to ABC Manufacturing. During the call, general processing unit 540 may stream audio and/or video information detected by webcam 510 over network 110 using network connection 112.

When the call is complete, general processing unit 540 may continue to receive one or more encrypted indications of audio information 511A. Concurrently, secure processing unit 580 may also receive encrypted indications of audio information 511A, and may determine that one or more encrypted indications of audio information 511A include a relock command. In response to detecting the relock command, secure processing unit 580 may generate a new public key 596 and a new private key 598, and may cause webcam 510 to generate encrypted indications of audio information 511A and encrypted indications of image information 511V using the new public key 596. Thereafter, when general processing unit 540 receives one or more encrypted indications of audio information 511A encrypted using the new public key 596, general processing unit 540 may be unable to decrypt encrypted indications of audio information 511A. Similarly, when general processing unit 540 receives one or more encrypted indications of image information 511V encrypted using the new public key 596, general processing unit 540 may be unable to decrypt encrypted indications of image information 511V. Accordingly, general processing unit 540 may no longer have access to audio or video information detected by webcam 510, and computing system 500 may transition to a locked state. In the locked state, an unauthorized user that may attempt to access audio or video information captured by webcam 510 might not succeed, because even if an unauthorized user gains access to general processing unit 540, general processing unit 540 no longer has the ability to decrypt the audio or video information general processing unit 540 receives from webcam 510.

Figure 7:
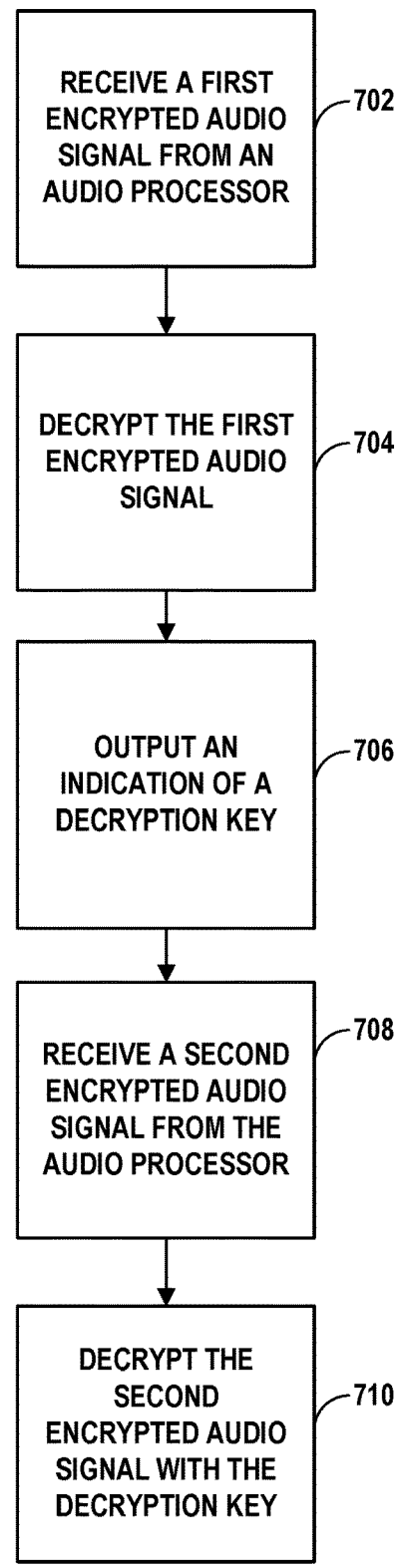
FIG. 7 is a flow diagram illustrating operations performed by an example computing system in accordance with one or more aspects of the present disclosure.

FIG. 7 is a flow diagram illustrating operations performed by an example computing system in accordance with one or more aspects of the present disclosure. FIG. 7 is described below within the context of computing system 100 of FIG. 2. In other examples, operations described in FIG. 7 may be performed by one or more other components, modules, systems, or devices. Further, in other examples, operations described in connection with FIG. 7 may be merged, performed in a difference sequence, or omitted.

Secure processing unit 280 may receive a first encrypted audio signal from an audio processor (702). For example, sensing device 210 may detect audio input, generate one or more encrypted indications of audio information 211, and send encrypted indications of audio information 211 to secure processing unit 280. Secure processing unit 280 may receive from sensing device 210 encrypted indications of audio information 211.

Secure processing unit 280 may decrypt the first encrypted audio signal (704). For example, secure processing unit 280 may generate unencrypted audio information by decrypting, using private decryption key 298, encrypted indications of audio information 211.

Responsive to determining that the first encrypted audio signal includes an unlock command, secure processing unit 280 may output an indication of a decryption key (706). For example, if secure processing unit 280 determines that the unencrypted audio information includes passcode 299, secure processing unit 280 may send private decryption key 298 to general processing unit 240.

General processing unit 240 may receive a second encrypted audio signal from the audio processor (708). For example, sensing device 210 may detect audio input, generate one or more encrypted indications of audio information 211, and send encrypted indications of audio information 211 to general processing unit 240. General processing unit 240 may receive from sensing device 210 encrypted indications of audio information 211.

General processing unit 240 may decrypt the second encrypted audio signal with the decryption key (710). For example, general processing unit 240 may generate unencrypted audio information by decrypting, using private decryption key 298, encrypted indications of audio information 211.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not identified as being performed automatically. Also, certain operations, acts, steps, or events described as being performed automatically might be alternatively not performed automatically, but rather, such operations, acts, steps, or events might be, in some examples, performed in response to input or another event.

In accordance with one or more aspects of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

Clause 1. A computing system comprising: at least one microphone coupled to an audio processor, the audio processor being configured to receive at least one audio signal from the at least one microphone and generate a first encrypted audio signal and a second encrypted audio signal; a secure processing unit configured to: receive the first encrypted audio signal from the audio processor, decrypt the first encrypted audio signal, and responsive to determining that the first encrypted audio signal includes an unlock command, output an indication of a decryption key; and a general processing unit configured to: receive the second encrypted audio signal from the audio processor, and decrypt the second encrypted audio signal with the decryption key.

Clause 2. The computing system of any other clause, including clause 1, wherein decrypting the first encrypted audio signal includes: decrypting the first encrypted audio signal with the decryption key.

Clause 3. The computing system of any other clause, including clause 1, wherein the decryption key is a general processing unit decryption key, and wherein decrypting the first encrypted audio signal includes: decrypting the first encrypted audio signal with a secure processing unit decryption key that is different than the general processing unit decryption key.

Clause 4. The computing system of any other clause, including clause 1, wherein the general processing unit is further configured to: determine, based on the second encrypted audio signal, an operation; responsive to determining the operation, send a request over a network, wherein the request includes information determined by decrypting the second encrypted audio signal; and responsive to sending the request over the network, receive information over the network.

Clause 5. The computing system of any other clause, including clause 1, wherein the secure processing unit is further configured to: generate the decryption key; and responsive to determining that a duration of time has elapsed since generating the decryption key, generate a new decryption key.

Clause 6. The computing system of any other clause, including clause 5, wherein the secure processing unit is further configured to: send, to the audio processor, an indication of the new decryption key.

Clause 7. The computing system of any other clause, including clause 1, wherein the computing system further comprises at least one camera coupled to an image processor, the image processor being configured to receive a video signal from the camera and generate an encrypted video signal, and wherein the general processing unit is further configured to: receive the encrypted video signal from the image processor; and decrypt the encrypted video signal.

Clause 8. The computing system of any other clause, including clause 7, wherein the decryption key is an audio decryption key and wherein decrypting the encrypted video signal includes: decrypting the video signal with a video decryption key that is different than the audio decryption key.

Clause 9. A method comprising: receiving, by a secure processing unit, a first encrypted audio signal from an audio processor; decrypting, by the secure processing unit, the first encrypted audio signal; responsive to determining that the first encrypted audio signal includes an unlock command, output, by the secure processing unit, an indication of a decryption key; receiving, by a general processing unit, a second encrypted audio signal from the audio processor; and decrypting, by the general processing unit, the second encrypted audio signal with the decryption key.

Clause 10. The method of any other clause, including clause 9, wherein decrypting the first encrypted audio signal includes: decrypting the first encrypted audio signal with the decryption key.

Clause 11. The method of any other clause, including clause 9, wherein the decryption key is a general processing unit decryption key, and wherein decrypting the first encrypted audio signal includes: decrypting the first audio signal with a secure processing unit decryption key that is different than the general processing unit decryption key.

Clause 12. The method of any other clause, including clause 9, further comprising: determining, by the general processing unit, based on the second encrypted audio signal, an operation; responsive to determining the operation, sending, by the general processing unit, a request over a network, wherein the request includes information determined by decrypting the second encrypted audio signal; and responsive to sending the request over the network, receiving, by the general processing unit, information over the network.

Clause 13. The method of any other clause, including clause 9, further comprising: generating, by the secure processing unit, the decryption key; and responsive to determining, by the secure processing unit, that a duration of time has elapsed since generating the decryption key, generating, by the secure processing unit, a new decryption key.

Clause 14. The method of any other clause, including clause 13, further comprising: sending, by the secure processing unit, to the audio processor, an indication of the new decryption key.

Clause 15. A computing system comprising: at least one sensor coupled to an input processor, the input processor being configured to receive at least one signal from the at least one sensor including both audio and video data, and generate a first encrypted signal and a second encrypted signal; a secure processing unit configured to: receive the first encrypted signal from the input processor, decrypt the first encrypted signal, and responsive to determining that the first encrypted signal includes an unlock command, output an indication of a decryption key; and a general processing unit configured to: receive the second encrypted signal from the input processor, and decrypt the second encrypted signal with the decryption key.

Clause 16. The computing system of any other clause, including clause 15, wherein decrypting the first encrypted signal includes: decrypting the first encrypted signal with the decryption key.

Clause 17. The computing system of any other clause, including clause 15, wherein the decryption key is a general processing unit decryption key, and wherein decrypting the first encrypted signal includes: decrypting the first encrypted signal with a secure processing unit decryption key that is different than the general processing unit decryption key.

Clause 18. The computing system of any other clause, including clause 15, wherein the general processing unit is further configured to: determine, based on the second encrypted signal, an operation; responsive to determining the operation, send a request over a network, wherein the request includes information determined by decrypting the second encrypted signal; and responsive to sending the request over the network, receive information over the network.

Clause 19. The computing system of any other clause, including clause 15, wherein the secure processing unit is further configured to: generate the decryption key; and responsive to determining that a duration of time has elapsed since generating the decryption key, generate a new decryption key.

Clause 20. The computing system of any other clause, including clause 19, wherein the secure processing unit is further configured to: sending, to the input processor, an indication of the new decryption key.

Clause 21. A system comprising means for performing any of the methods of clauses 9-14.

Clause 22. A computing device comprising means for performing any of the methods of clauses 1-9.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A computing system, comprising:
   a microphone configured to capture audio signals, including audio signals from a user;
   an audio processor coupled to the microphone and configured to:
   encrypt the captured audio signals, and
   generate a first encrypted audio signal and a second encrypted audio signal;
   a secure processing unit coupled to the audio processor, the secure processing unit isolated from any network interface of the computing system; and
   a general processing unit coupled to the audio processor and the secure processing unit;
   wherein the secure processing unit is configured to:
   receive the first encrypted audio signal from the audio processor,
   decrypt the first encrypted audio signal,
   determine whether the first encrypted audio signal includes a passcode from the user; and
   responsive to determining that the first encrypted audio signal includes the passcode from the user, output an indication of a decryption key to the general processing unit; and
   wherein the general processing unit is configured to:
   receive the second encrypted audio signal from the audio processor,
   decrypt the second encrypted audio signal with the decryption key,
   obtain an operation to be performed based on the decrypted second encrypted audio signal, and
   in response to obtaining the operation to be performed, executing the operation.

2. The computing system of claim 1, wherein decrypting the first encrypted audio signal includes:
   decrypting the first encrypted audio signal with the decryption key.

3. The computing system of claim 1, wherein the decryption key is a general processing unit decryption key, and wherein decrypting the first encrypted audio signal includes:
   decrypting the first encrypted audio signal with a secure processing unit decryption key that is different than the general processing unit decryption key.

4. The computing system of claim 1, wherein:
   executing the operation comprises:
   sending a request over a network, wherein the request includes information determined by decrypting the second encrypted audio signal;
   responsive to sending the request over the network, receiving information over the network; and
   presenting at least a portion of the received information to the user.

5. The computing system of claim 1, wherein the secure processing unit is further configured to:
   generate the decryption key; and
   responsive to determining that a duration of time has elapsed since generating the decryption key, generate a new decryption key.

6. The computing system of claim 5, wherein the secure processing unit is further configured to:
   send, to the audio processor, an indication of the new decryption key.

7. The computing system of claim 1, wherein the computing system further comprises at least one camera coupled to an image processor, the image processor being configured to receive a video signal from the camera and generate an encrypted video signal, and wherein the general processing unit is further configured to:
   receive the encrypted video signal from the image processor; and
   decrypt the encrypted video signal in response to authorization from the secure processing unit.

8. The computing system of claim 7, wherein the decryption key is an audio decryption key and wherein decrypting the encrypted video signal includes:
   decrypting the video signal with a video decryption key that is different than the audio decryption key.

9. A method performed at a computing system, comprising:
   at an audio processor of the computing system:
   receiving audio signals from a microphone;
   encrypting the audio signals to generate a first encrypted audio signal and a second encrypted audio signal; and
   outputting the first and second encrypted audio signals;
   at a secure processing unit of the computing system coupled to the audio processor, the secure processing unit isolated from any network interface of the computing system:
   receiving the first encrypted audio signal from the audio processor;
   decrypting the first encrypted audio signal; and
   responsive to determining that the first encrypted audio signal includes a passcode from a user, outputting an indication of a decryption key; and
   at a general processing unit of the computing system coupled to the audio processor and the secure processing unit:
   receiving the second encrypted audio signal from the audio processor;
   responsive to the secure processing unit outputting the indication of the decryption key, decrypting the second encrypted audio signal with the decryption key;
   identifying an operation to be performed based on the decrypted second encrypted audio signal; and
   in accordance with identification of the operation to be performed, performing the operation.

10. The method of claim 9, wherein decrypting the first encrypted audio signal includes:
    decrypting the first encrypted audio signal with the decryption key.

11. The method of claim 9, wherein the decryption key is a general processing unit decryption key, and wherein decrypting the first encrypted audio signal includes:

decrypting the first audio signal with a secure processing unit decryption key that is different than the general processing unit decryption key.

12. The method of claim 9, wherein performing the operation comprises:
   sending, by the general processing unit, a request over a network, wherein the request includes information determined by decrypting the second encrypted audio signal; and
   responsive to sending the request over the network, receiving, by the general processing unit, information over the network.

13. The method of claim 9, further comprising:
   generating, by the secure processing unit, the decryption key; and
   responsive to determining, by the secure processing unit, that a duration of time has elapsed since generating the decryption key, generating, by the secure processing unit, a new decryption key.

14. The method of claim 13, further comprising:
   sending, by the secure processing unit, to the audio processor, an indication of the new decryption key.

15. A computing system, comprising:
   a network interface;
   a microphone;
   a camera;
   an input processor coupled to the microphone and the camera, the input processor configured to:
      receive respective signals from the microphone and the camera, the received signals including both audio and video data; and
      generate a first encrypted signal and a second encrypted signal from the received signals;
   a secure processing unit isolated from the network interface and configured to:
      receive the first encrypted signal from the input processor;
      decrypt the first encrypted signal; and
      responsive to determining that the first encrypted signal includes a passcode from a user, output an indication of a decryption key; and
   a general processing unit coupled to the network interface and configured to:
      receive the second encrypted signal from the input processor;
      receive the indication of the decryption key from the secure processing unit;
      responsive to receiving the indication of the decryption key, decrypt the second encrypted signal with the decryption key;
      determine an operation to be performed based on the decrypted second encrypted signal; and
      in accordance with determining the operation to be performed, execute the operation.

16. The computing system of claim 15, wherein decrypting the first encrypted signal includes:
   decrypting the first encrypted signal with the decryption key.

17. The computing system of claim 15, wherein the decryption key is a general processing unit decryption key, and wherein decrypting the first encrypted signal includes:
   decrypting the first encrypted signal with a secure processing unit decryption key that is different than the general processing unit decryption key.

18. The computing system of claim 15, wherein executing the operation comprises:
   sending a request over a network via the network interface, wherein the request includes information determined by decrypting the second encrypted signal;
   responsive to sending the request over the network, receiving information over the network via the network interface; and
   causing the received information to be presented to the user.

19. The computing system of claim 15, wherein the secure processing unit is further configured to:
   generate the decryption key; and
   responsive to determining that a duration of time has elapsed since generating the decryption key, generate a new decryption key.

20. The computing system of claim 19, wherein the secure processing unit is further configured to:
   sending, to the input processor, an indication of the new decryption key.

* * * * *

UNITED STATES PATENT AND TRADEMARK OFFICE
CERTIFICATE OF CORRECTION

PATENT NO. : 10,237,268 B2
APPLICATION NO. : 15/342083
DATED : March 19, 2019
INVENTOR(S) : Price et al.

It is certified that error appears in the above-identified patent and that said Letters Patent is hereby corrected as shown below:

On the Title Page

(57) ABSTRACT, Line 1, please delete "described that at" and insert --describe with at--;

In the Claims

Claim 20, Column 38, Line 40, please delete "sending, to" and insert --send, to--.

Signed and Sealed this
Twenty-eighth Day of May, 2019

Andrei Iancu
*Director of the United States Patent and Trademark Office*